US011980585B2

(12) United States Patent
Ta

(10) Patent No.: US 11,980,585 B2
(45) Date of Patent: May 14, 2024

(54) COUPLING DEVICE FOR SECURING A GAS DISCHARGE APPARATUS INSIDE A GAS DELIVERY CONDUIT OF A FLUID IMPERMEABLE LINER COVERING A LIQUID-RECEIVING BASIN

(71) Applicant: Contego Spa Designs, Inc., Garden Grove, CA (US)

(72) Inventor: Jeff Ta, Garden Grove, CA (US)

(73) Assignee: Contego Spa Designs, Inc., Garden Grove, CA (US)

( * ) Notice: Subject to any disclaimer, the term of this patent is extended or adjusted under 35 U.S.C. 154(b) by 162 days.

(21) Appl. No.: 17/324,031

(22) Filed: May 18, 2021

(65) Prior Publication Data

US 2021/0361528 A1 Nov. 25, 2021

Related U.S. Application Data

(60) Provisional application No. 63/026,858, filed on May 19, 2020.

(51) Int. Cl.

*A61H 33/02* (2006.01)
*A61H 35/00* (2006.01)
*B05B 15/65* (2018.01)

(52) U.S. Cl.

CPC ......... *A61H 33/025* (2013.01); *A61H 35/006* (2013.01); *B05B 15/65* (2018.02)

(58) Field of Classification Search

CPC ..... A61H 33/025; A61H 35/006; B05B 15/65
See application file for complete search history.

(56) References Cited

U.S. PATENT DOCUMENTS 1,982,259 A * 11/1934 Martin ............... A61H 33/6036 4/541.4
2,848,203 A * 8/1958 Misiura ................ A61H 33/025 261/124
3,367,325 A * 2/1968 O'Keefe ............. A61H 33/025 601/168
5,653,272 A * 8/1997 McCaul ................. A63H 27/10 141/46
5,682,626 A * 11/1997 Banks, Jr. .............. A47K 3/122 4/579
7,037,280 B1 * 5/2006 Burns .................... A61H 33/02 601/149

(Continued)

*Primary Examiner* — J C Jacyna
(74) *Attorney, Agent, or Firm* — VISTA IP LAW GROUP LLP

(57) ABSTRACT

A device for securing a discharge end of a gas discharge apparatus inside a gas delivery conduit of a fluid impermeable liner covering a liquid-receiving basin features a first portion configured to be supported on the basin so as to engage an outer face of the liner which normally engages the basin and a second portion of the device configured to be movable relative to the first portion to selectively engage an inner face of the liner in opposite relation to the first portion in a working position. The inner face of the liner delimits the interior of the liner-covered basin. The first and second portions are configured to cooperatively form a generally tubular cavity substantially encompassing the gas delivery conduit in the working position, to clamp the gas delivery conduit over the discharge end of the gas discharge apparatus to substantially form a fluidic seal therebetween.

23 Claims, 16 Drawing Sheets

(56) References Cited

U.S. PATENT DOCUMENTS

| | | | | |
|---|---|---|---|---|
| 7,147,016 | B1 * | 12/2006 | Nelson | A63H 27/10<br>141/114 |
| 10,195,108 | B2 * | 2/2019 | Ta | A61H 33/6089 |

* cited by examiner

COUPLING DEVICE FOR SECURING A GAS DISCHARGE APPARATUS INSIDE A GAS DELIVERY CONDUIT OF A FLUID IMPERMEABLE LINER COVERING A LIQUID-RECEIVING BASIN

This application claims the benefit under 35 U.S.C. 119(e) of U.S. Provisional Application Ser. No. 63/026,858 filed May 19, 2020.

FIELD OF THE INVENTION

This application relates to the field of a liner which is used in a basin to contain a liquid without the liquid contacting an inside face of the basin. The liner has a gas passageway for providing a fluid massage feature. There is provided a gas discharge apparatus which supplies gas, typically air, for discharge into the liquid.

The present invention relates to a coupling device for securing the gas discharge apparatus with the gas passageway of the liner.

BACKGROUND

Foot spas which are relatively commonplace in the spa industry for providing pedicures are one example of liquid-receiving basin in which a liner is used with the basin to contain a liquid.

When used in a salon setting where a plurality of customers one after another will share a single foot spa unit over the course of a business day, disposable one-time-use liners are employed for insertion into the respective foot spa so as to contain a soaking solution used for a respective client. That is, the respective liner is intended to isolate the soaking solution from the soaking basin, so that bacteria may not be transferred from one user to the next. Therefore, only the liner may have to be replaced in order to prepare the foot spa for a subsequent user, without necessarily having to clean the soaking basin to remove residue of the soaking solution and thus without concern about transfer of contaminants from one user to the next.

Therefore, use of disposable liners may enhance hygienic practices in the spa industry by reducing need for sanitizing the soaking basin. Furthermore, use of disposable liners may enhance practices for prevention of infection such as by providing a relatively inexpensive arrangement which is disposable, so that those elements of the pedicure treatment which are contaminated by the feet of the respective patient can be discarded thereby removing possibility of contaminating the next patient.

As known to those with ordinary skill in the art, not only are these foot spas suited for providing therapeutic soaking of the user's feet, many such spas are arranged to provide a soothing massage of the feet while the user relaxes his/her feet in a soaking basin of the foot spa during the therapeutic soak. The massage may be provided by vibratory elements which engage soles of the feet through the liner. In other cases, air may be forced through the liner so as to provide streams of bubbles for performing the massage through the fluid.

In some instances, it is more desirable to provide the bubbles for performing the massage of the feet than by means of the vibratory elements. However, it remains preferable especially in a commercial salon setting to balance performance of the foot spa, such as that characterized by its massage feature, with hygienic practices.

Additionally, the bubbles may be used for mixing the soaking solution, which may contain medicinal ingredients or into which medicinal substances may be added. As such, the bubbles conveniently provide agitation of the soaking solution so that the soaking solution may be circulated about the user's feet within the soaking basin of the spa. Thus, in the case that the soaking solution contains medicinal components, the agitation and circulation of the soaking solution may afford enhanced diffusion of the medicinal components in the solution and may allow the medicinal components to reach necessary areas of the user's feet.

Commercially available liners with a fluid massage feature such as the Applicant's product sold under the trade name AirJet liner comprise tubes attached at an inside face of a bag, which can be draped over the basin to cover same, that convey air from a discharge end of an air discharge apparatus, such as a blower, for subsequent discharge into the liquid contained by the bag. The tubes extend beyond a draped top of the bag to the discharge end positioned at a spaced height above the basin, and they are insertably received in openings defined by the discharge end of the air discharge apparatus.

SUMMARY OF THE INVENTION

According to an aspect of the invention there is provided a device for securing a discharge end of a gas discharge apparatus configured to discharge a gas inside a gas delivery conduit of a fluid impermeable liner covering a basin for containing liquid, wherein the gas delivery conduit is configured to convey the gas to a discharge portion of the liner configured to release the gas to an interior of the liner-covered basin, wherein the liner has an outer face for engaging the basin and an inner face for delimiting the interior of the liner-covered basin, the device comprising:

- a first portion configured to be supported on the basin so as to engage the outer face of the liner;
- a second portion configured to be movable relative to the first portion to selectively engage the inner face of the liner in opposite relation to the first portion in a working position;
- wherein the first and second portions are configured to cooperatively form a generally tubular cavity substantially encompassing the gas delivery conduit in the working position, to clamp the gas delivery conduit over the discharge end of the gas discharge apparatus to substantially form a fluidic seal therebetween.

This provides an arrangement which is particularly, but not exclusively, suited for use with a fluid impermeable liner with integrated gas delivery conduit defined within a thickness of the liner, such as that formed at a separable interface between two bodies of flexible plastic. In such a liner the gas delivery conduit does not extend beyond a bag portion of the liner which covers the basin to prevent contact of the liquid with the interior face of same.

In one arrangement, the second portion is hingedly connected to the first portion to be pivotally movable about an axis between the working position and an open position in which a side of the second portion distal to the axis is in spaced relation to the first portion.

In one arrangement, the first and second portions are configured to magnetically interconnect when arranged in the working position.

In one such arrangement, in which the first and second portions are configured to magnetically interconnect in the working position, the second portion is wholly separable from the first portion. This is particularly useful when the seal is to be formed at an intermediary location on the liner spaced from a peripheral edge thereof.

In one arrangement, the gas delivery conduit of the liner defines an opening configured to receive the discharge end of the gas discharge apparatus that is exposed at the inner face of the liner.

In one arrangement, the opening of the gas delivery conduit of the liner is arranged to be located at an interior face of the basin substantially defining a volume of the liquid which is containable in the basin, and the discharge end of the gas discharge apparatus is carried on a longitudinally extending tube arranged to extend from a location outside the interior of the basin and into said interior such that the tube is insertable into the gas delivery conduit to extend at least partially along the gas delivery conduit to resist relative movement of the liner transversely to the tube.

In one arrangement, the liner is flexible and the discharge end of the gas discharge apparatus, to be received inside the gas delivery conduit, comprises a rigid body.

In one arrangement, the first portion is arranged to be supported on a rim of the basin outside the interior of the basin where the liquid is containable.

According to another aspect of the invention there is provided a coupling device for use with a liner arranged in a basin to contain a liquid.

The basin has a bottom base, an upstanding basin wall extending upwardly from the bottom base, an inside face of the basin defined by the bottom base and the upstanding basin wall delimiting an interior volume of the basin where the liquid is received, and an air discharge apparatus arranged for supplying pressurized air to be discharged into the liquid.

Typically, the liner includes:

a flexible bag which has a peripheral edge defining an open top of the bag for placing in the basin in a working configuration of the liner in which the bag is covering the inside face of the basin with an outer face of the is substantially in engagement with the inside face of the basin;

an inner face of the bag delimiting an interior of the bag in which the liquid is to be contained;

the bag having a thickness measured between the outer face and the inner face;

the bag including an air conduit defined within the thickness of the bag and adapted for guiding the pressurized air from the air discharge apparatus to the interior of the bag;

the air conduit having a starting end which is operatively connectable to the air discharge apparatus to receive the pressurized air therefrom;

the air conduit having a discharge portion which is fluidically communicated with the interior of the bag for discharging the pressurized air thereto; and the starting end of the air conduit including an aperture defined in the outer face of the bag for passing a fluidic coupler of the air discharge apparatus therethrough into operative fluidic communication with the air conduit.

In the illustrated arrangement, the liner includes:

a first body of flexible plastic having:

an outer face for resting against the inside face of the basin; and an inner face opposite to the outer face;

a second body of flexible plastic having an interior face and an opposite exterior face;

the interior face of the second body of flexible plastic being joined to the inner face of the first body of flexible plastic which collectively define an interface of the first and second bodies of flexible plastic;

the joined first and second bodies of flexible plastic forming a bag, which has a peripheral edge defining an open top of the bag, for placing in the basin in a working configuration of the liner in which the bag is covering the inside face of the basin with the outer face of the first body of flexible plastic substantially in engagement with the inside face of the basin;

the exterior face of the second body of flexible plastic delimiting an interior of the bag in which the liquid is to be contained;

the bag having a thickness measured between the outer face of the first body of flexible plastic and the exterior face of the second body of flexible plastic;

a length of the air conduit being formed at the interface of the first and second bodies of flexible plastic such that a circumferential wall of said length of the air conduit is defined in part by the inner face of the first body of flexible plastic and in part by the interior face of the second body of flexible plastic; and the starting end of the air conduit including an aperture defined in the first body of flexible plastic for passing a fluidic coupler of the air discharge apparatus therethrough into operative fluidic communication with the air conduit.

The coupling device comprises:

a pair of interconnected legs having distal ends which are spaced from one another;

each one of the legs defining an engaging surface on a common side of the pair of interconnected legs for contacting the inner face of the bag;

the coupling device being operatively mountable to the basin in a working position in which an area of the bag around the aperture is pinched between the inside face of the basin and the engaging surfaces of the legs which are in contact with the inner face of the bag, the distal ends of the legs being located on either side of the air conduit, so as to form a seal between the fluidic coupler of the air discharge apparatus and the starting end of the air conduit.

When the liner comprises the first and second bodies of flexible plastic, then the engaging surfaces of the legs contact the exterior face of the second body of flexible plastic.

In one arrangement the coupling device includes a base which is mountable to the basin and which is arranged to extend from a location on the basin which is outside the bag and over the top of the bag into the interior of the bag.

According to yet another aspect of the invention there is provided a method for securing a discharge nozzle of a gas discharge apparatus configured to discharge a gas inside a gas delivery conduit of a fluid impermeable liner covering a basin for containing a liquid, wherein the gas delivery conduit is configured to convey the gas to a discharge portion of the liner configured to release the gas to an interior of the liner-covered basin, the method comprising:

stretching the gas delivery conduit over the discharge nozzle therein to form a fluidic seal therebetween.

The method may further include clamping the stretched gas delivery conduit over the nozzle using a device configured to form a generally tubular cavity around the nozzle with the gas delivery conduit received thereover. This may further enhance the fluidic seal.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1A:
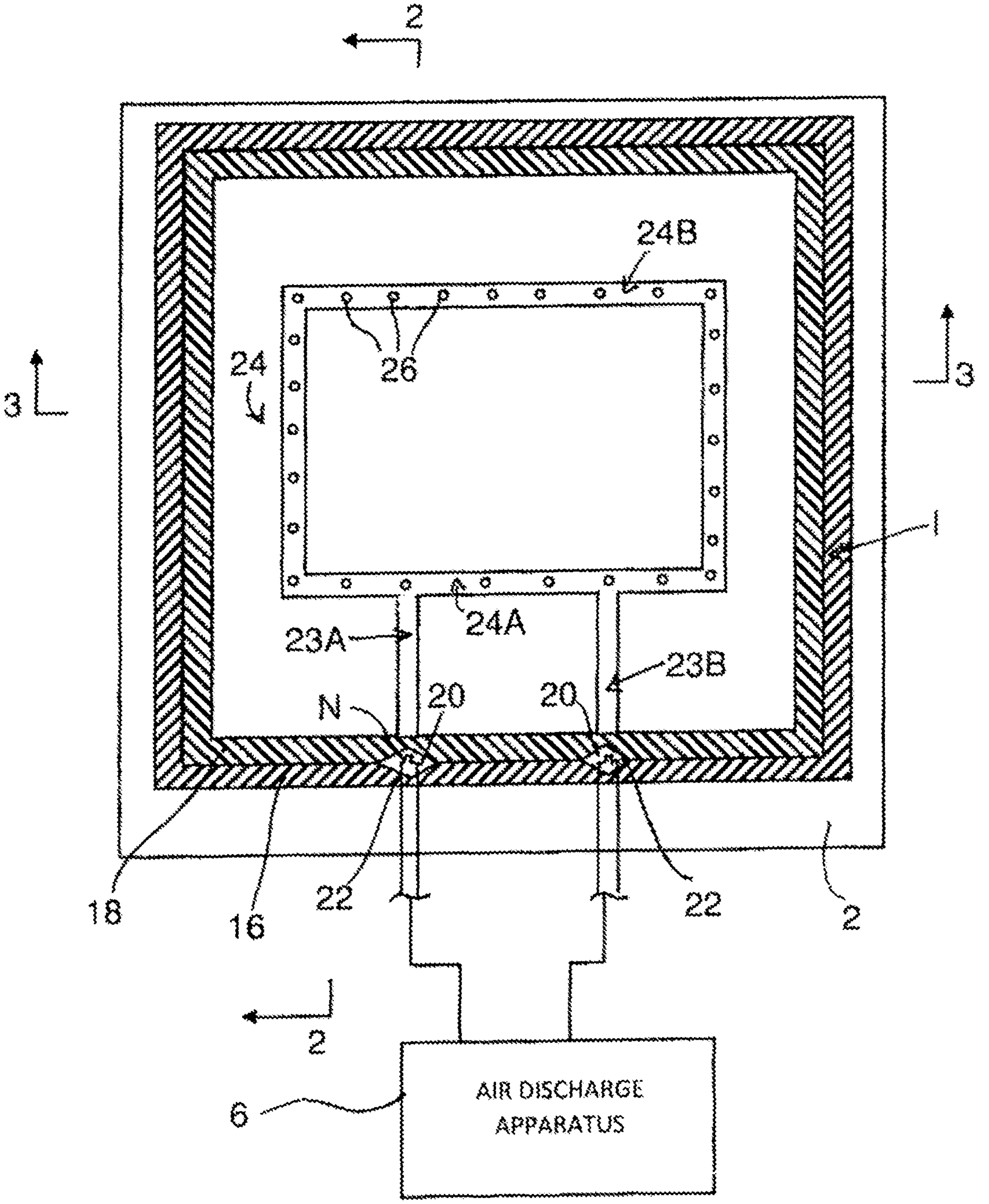
FIG. 1A is a top plan view of foot spa and a first arrangement of liner with a top portion of the liner removed to show an air conduit therein.

Referring to the accompanying figures, there is illustrated a liner that is generally indicated by reference numeral 10, which is suited for use with a foot spa 1. As will be described in more detail hereinafter, the liner is arranged for nesting in a soaking basin 2 of the foot spa in a working configuration of the liner so as to fit in the soaking basin and cover an inside face of the soaking basin, with the soaking basin providing structural support for the liner. Thus, the liner 10, which is disposable so as to be suited for one-time use, provides a generally basin-shaped receptacle with a base floor 12 and raised peripheral receptacle wall 14 extending from the base floor for containing a soaking solution in isolation of the soaking basin 2 of the foot spa 1.

The soaking basin 2, which is suited for receiving feet of a user, comprises a bottom base 3 and an upstanding peripheral basin wall 4 extending upwardly from the bottom base. In the illustrated embodiment, the bottom base and the basin wall are unitary so as to form a single solid body. It will be appreciated that the inside face of the soaking basin is defined by the bottom base 3 and the upstanding peripheral basin wall 4 and that the inside face delimits an interior volume of the basin where the soaking solution, that is, liquid, is received.

An air discharge apparatus 6 (schematically shown) is provided with the foot spa 1 for generating pressurized air. This air discharge apparatus (including an air pressurization device and tubing/ducting extending therefrom) may be housed entirely within the soaking basin, such as in the bottom base thereof. In the illustrated embodiment, the air discharge apparatus comprises an air pump; in other embodiments, the air discharge apparatus may comprise a suitable air blower. The air discharge apparatus draws ambient air from outside the soaking basin 2 and supplies the pressurized air formed by the air discharge apparatus at a supply location S which is at or adjacent the inside face of the soaking basin. Note that it is the inside face of the soaking basin which receives the liner 10. Furthermore, in the illustrated embodiment, the supply location S is located on the inside face just below a top rim 4A of the basin wall 4. At this particular location, a supply end of the air discharge apparatus supports an air discharge apparatus coupler, to which the liner is connectable, in a position which is presented above a typical waterline of the soaking solution that is indicated at W. This supply end acts to discharge the air for subsequent transfer to the liner's air conduit.

Additionally, the soaking basin includes a heating element 8 (schematically shown) disposed in the bottom base 3 so as to be housed therein. The heating element 8 is standalone from the air discharge apparatus and generates heat for heating the soaking solution contained by the liner 10.

Turning now to the liner, the liner 10 comprises a first body of plastic material 16 which is flexible. This first body of flexible plastic 16 forms an outer layer of the liner. The first body of plastic has an outer face 16A for resting at or adjacent the inside face of the soaking basin 2. That is, the outer face 16A of the first plastic body may be rested at the inside face of the soaking basin and thus in engagement therewith. The first body of plastic may also be rested in the soaking basin but with the body's outer face 16A adjacent the inside face of the soaking basin so as to be in spaced relation relative thereto (such that, for example, an additional element may be disposed intermediate the inside face of the soaking basin and the first body of plastic). Furthermore, the first body of plastic has an inner face 16B opposite to its outer face 16A.

The liner includes a second body of plastic material 18, which is also flexible, joined to the inner face 16B of the first body of plastic. Thus, the second body of flexible plastic forms an inner layer of the liner, with the inner face 16B of the first outer plastic layer forming an interface I between the outer and inner layers. The second body of plastic lines an inside volume of the receptacle formed by the liner 10.

As noted earlier, the first and second bodies of plastic 16, 18 are shaped to form the generally basin-shaped receptacle for holding the soaking solution in the inside volume of the liner. The liner may be pre-shaped so as to more readily conform to a shape of the soaking basin 2 provided by the bottom base 3 and the peripheral basin wall 4. Also, basin-shaped' refers to a structure having a bottom and an upstanding wall extending upwardly from the bottom about its periphery so as to form a container. The periphery may be circular or rectangular in shape, for example, and is thus not intended to be limited in its specific shape.

It will be appreciated that the liner 10, as a whole, may be significantly flexible so as to be like a garbage bag, where the liner conforms to a shape of the soaking basin when the liner is nested therein. Alternatively, the liner 10 may be of a hard shell variety such that the liner takes on the shape of the soaking basin free of any structural support provided by the soaking basin.

In the illustrated embodiment, the first and second bodies of plastic are joined at the interface I by heat sealing the two bodies 16, 18 together to one another. As such, both the first and second bodies comprise suitable thermoplastic material, which is also sufficiently resistant to heat so as to not melt when the heating element 8 is operated for heating the soaking solution. Through heat sealing, the two bodies of plastic are permanently coupled to one another at predetermined areas of the interface I. Also, certain prescribed areas between the first and second bodies of plastic 16, 18 are left untreated by the heat sealing process so that the two bodies of plastic are not welded together at these prescribed areas and are thus free to separate from direct engagement with one another thereat.

Thus, an air conduit 20 is formed between the first and second bodies of plastic at these prescribed areas where the two bodies of plastic are not affixed to one another. In the illustrated embodiment, the air conduit 20 extends from a starting end 21 located at a top free end 14A of the receptacle wall, and across the receptacle wall 14 to the base floor 12. That is, the air conduit's starting end 21 is spaced just below a common free end of the first and second bodies of plastic so that a sealed interface is located between the common free end of the bodies to a side of the starting end 21 of the air conduit. As such, the air conduit 20 spans a full height of the receptacle wall 14 and across a majority of a transverse width of the base floor 12. The air conduit 20 is suited for guiding the pressurized air supplied by the air discharge apparatus 6 to the base floor of the liner. Accordingly, the air conduit has a coupling arrangement 22 at the respective starting end 21 of the air conduit for connecting to the air discharge apparatus, which will be described in greater detail later.

Turning to the air conduit in more detail, the air conduit 20 comprises a plurality of supply branches—more specifically, a pair of supply branches 23A and 23B in the illustrated arrangements—which converge with a discharge portion of the air conduit at its terminal end that is located at the base floor 12 of the liner for discharging the air into the liner's inside volume as it will become apparent shortly.

In the first arrangement as more clearly shown in FIG. 1A, the discharge portion of the air conduit forms a centralized closed loop 24 at the base floor. The closed loop is rectangular in shape in the illustrated arrangement; however, in alternative embodiments, the closed loop may comprise any polygonal shape, for example a circle, a hexagon, or a polygon with sides of non-uniform length so as to be generally annular. Furthermore, in alternative embodiments the closed loop may be shaped so as to form an outline of a logo or an aesthetically pleasing pattern. The supply braches 23A, 23B converge with the closed loop at spaced locations separately of one another, and at a common side of the closed loop 24. Thus, the closed loop 24 comprises an intermediate portion 24A between junctions of the respective supply branch with the closed loop, and an outer ring portion 24B which is longer in length than the intermediate portion of the closed loop.

Figure 1B:
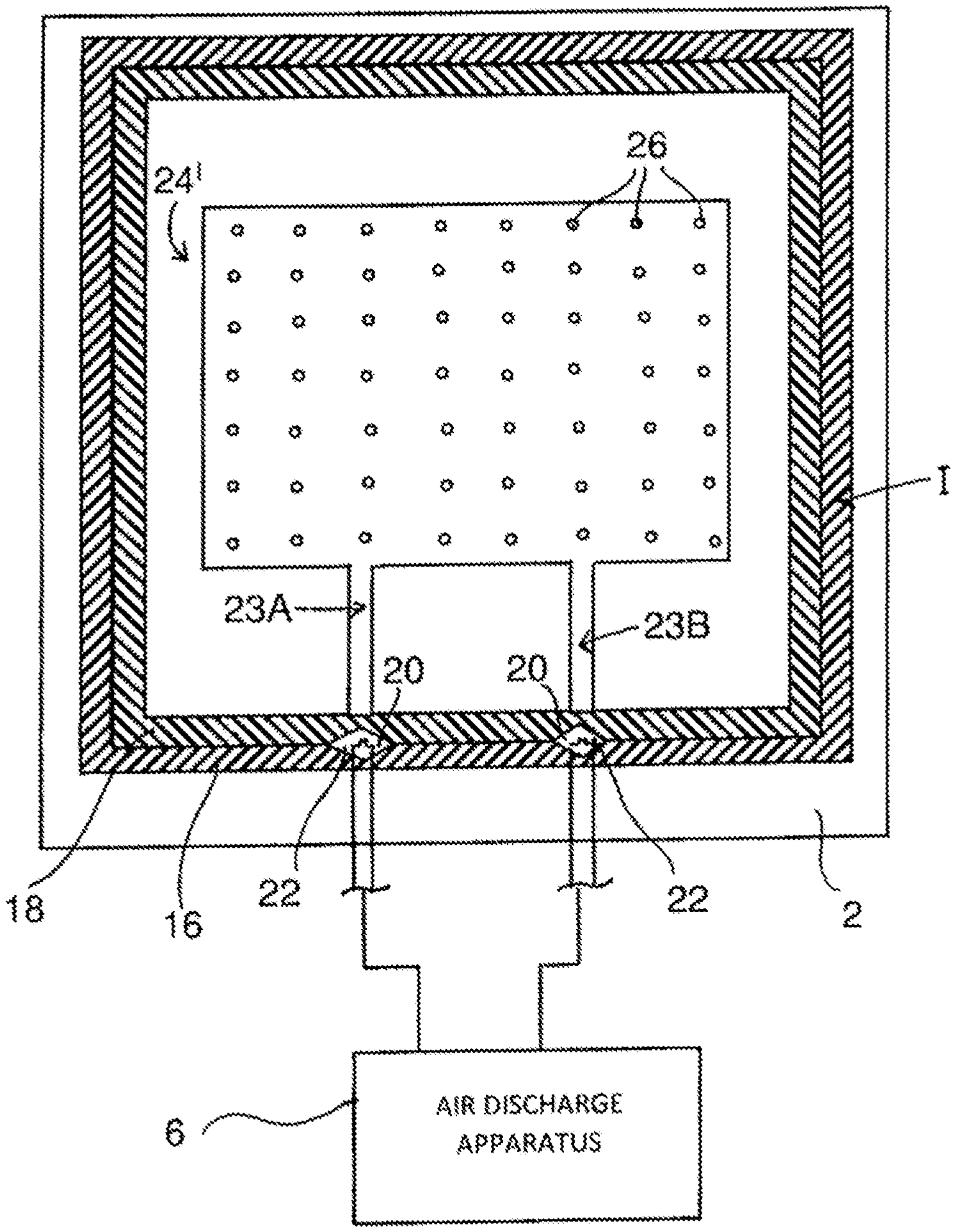
FIG. 1B is a top plan view like that shown in FIG. 1A but of a second arrangement of liner.

In another arrangement as shown in FIG. 1B, the discharge portion forms a single centralized chamber 24' fed by two supply branches 23A, 23B which meet the chamber at spaced locations at its perimeter. As such, the air conduit enlarges in cross-section from the relatively narrow supply branches 23A or 23B into the much wider chamber 24' at the air conduit's terminal end. That is, the chamber has a larger wall-to-wall width than either one of the supply branches as measured diametrically across same in transverse cross-section. In the illustrated arrangement, the chamber 24' is localized to the base floor 12 of the liner but covers a relatively large area thereof. Note that in other arrangements having the single chamber 24', the air discharge apparatus may comprise a plurality of individual units such as a plurality of suitable air pumps to provide sufficient pressure through the air conduit.

Figure 2A:
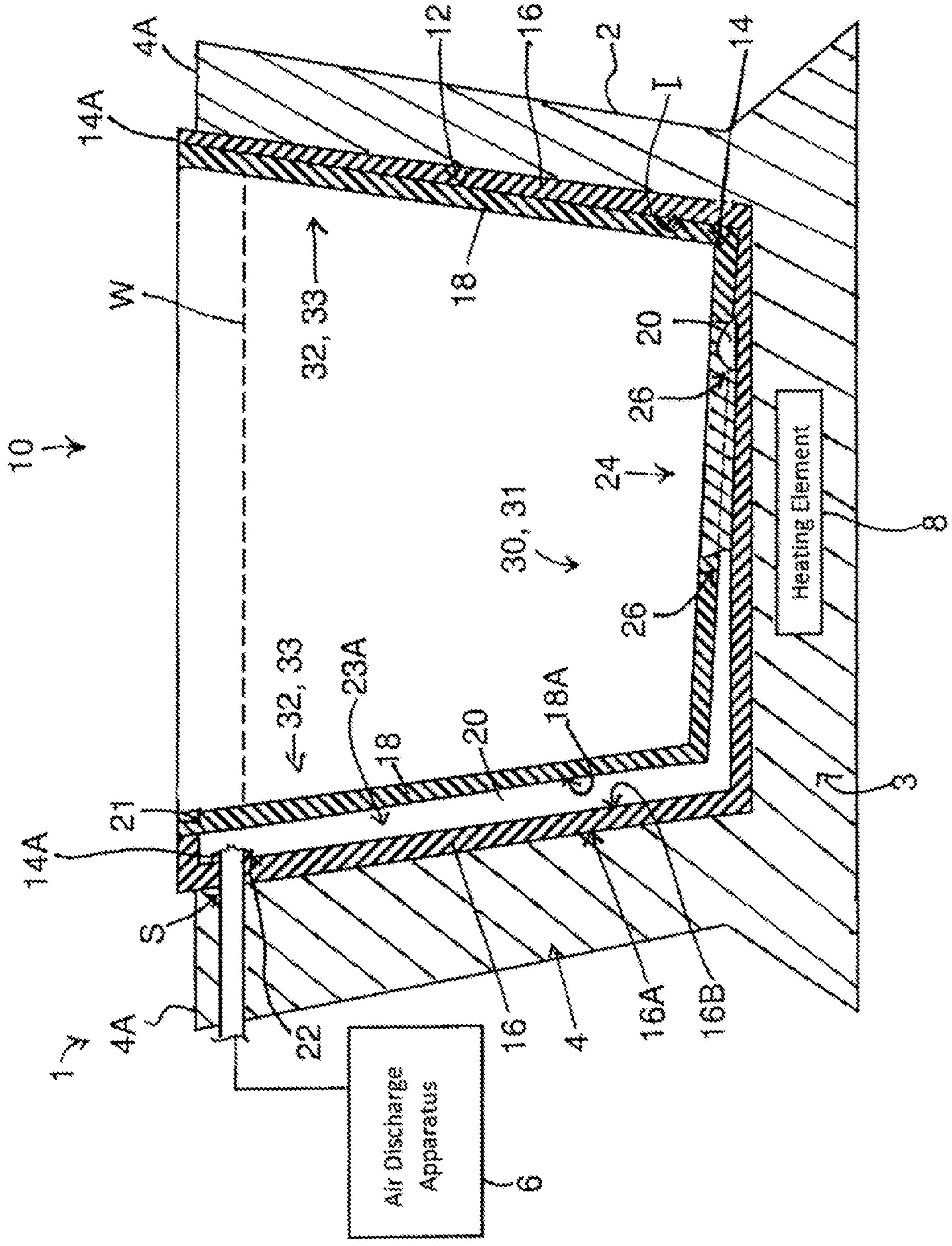
FIG. 2A is a cross-sectional view along line 2-2 in FIG. 1A of the first arrangement.
Figure 2B:
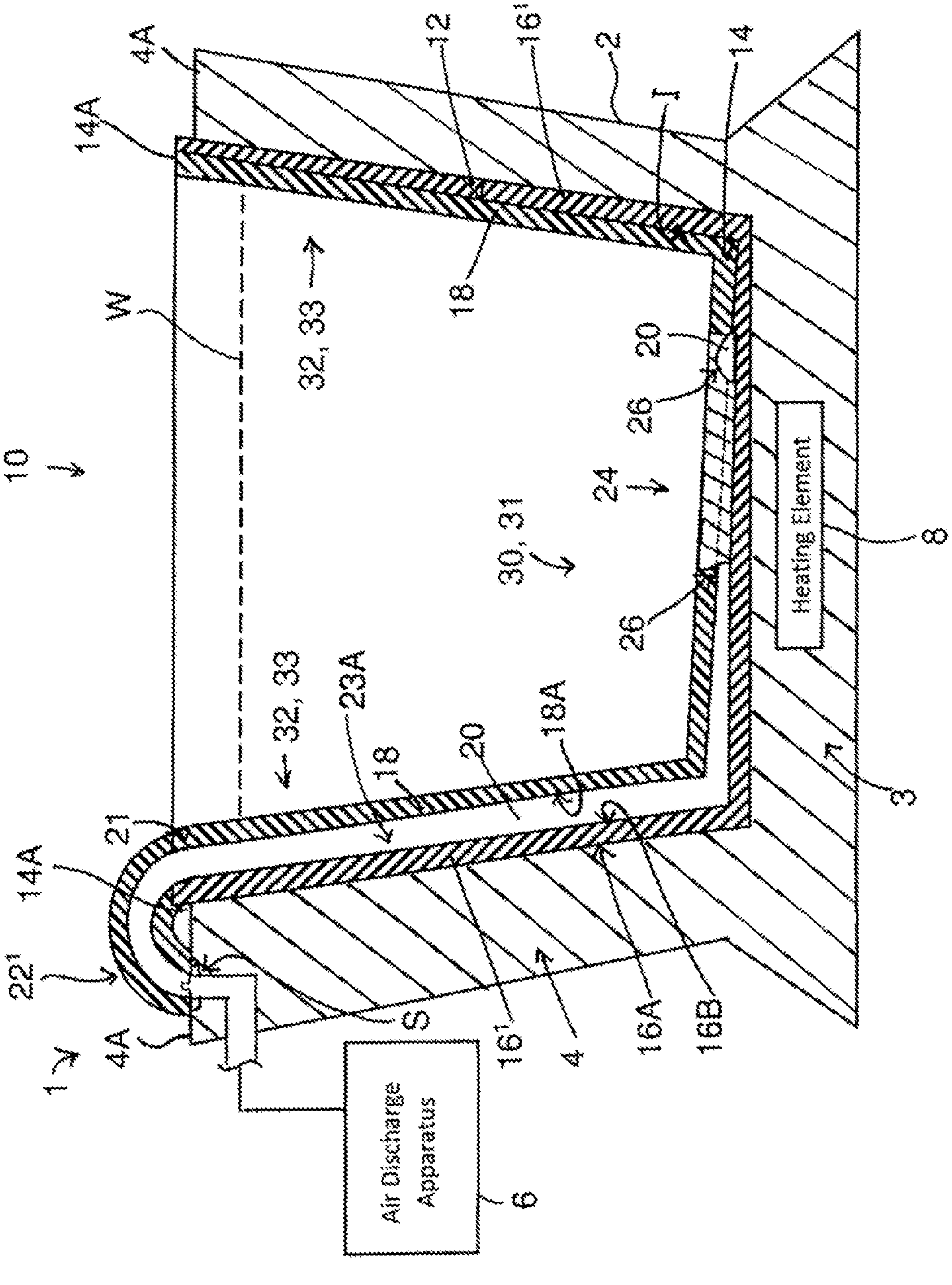
FIG. 2B is a cross-sectional view along line 2-2 like that shown in FIG. 2A but of a third arrangement of liner.
Figure 3:
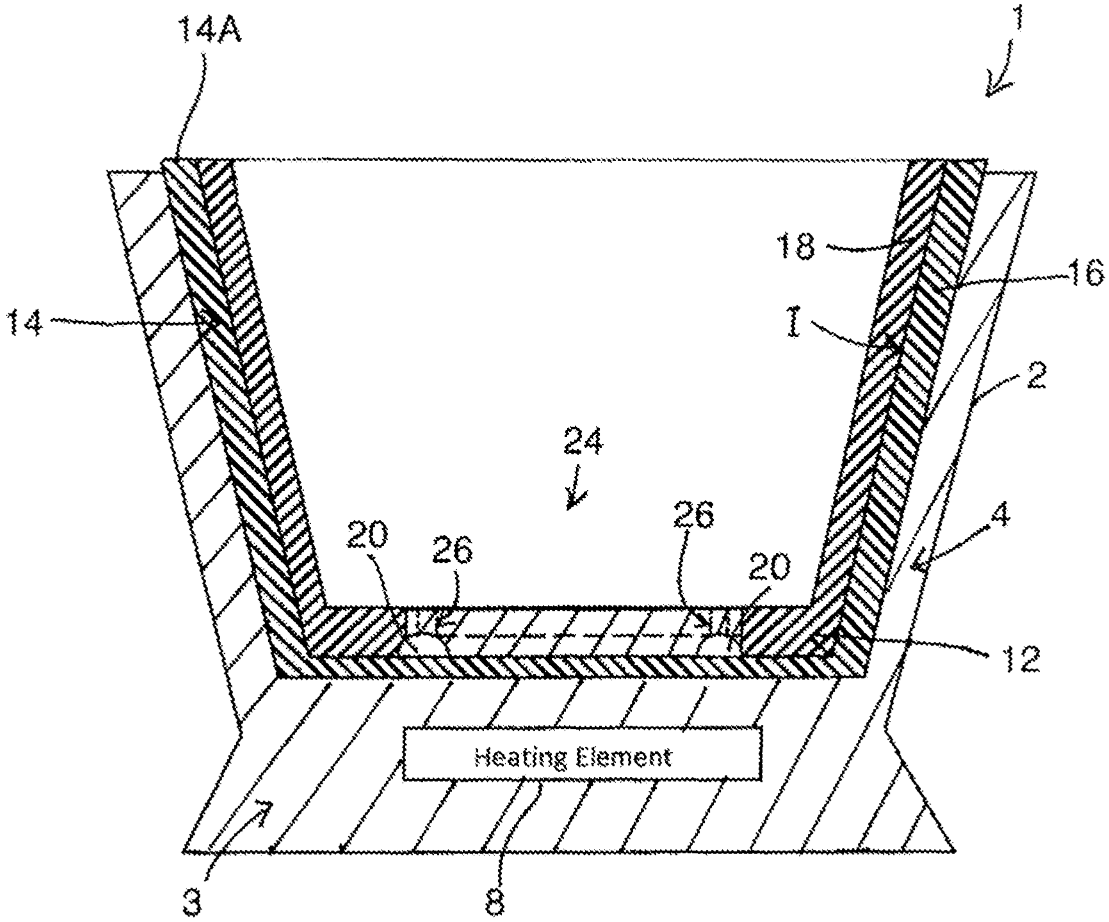
FIG. 3 is a cross-sectional view along line 3-3 in FIG. 1A.

In order to complete the transfer of the pressurized air from the air discharge apparatus 6 and through the air conduit 20 into the inside volume of the liner such as to provide a fluid massage of the user's feet inserted in the soaking solution, a plurality of openings 26 are provided, being located in the second body of plastic 18. In the illustrated embodiment, the openings 26 are aligned with the air conduit 20 so as to be disposed at spaced positions along the air conduit's length. More specifically, the openings 26 are spaced along the closed loop 24 of the air conduit and spaced across the plan area of the chamber 24' in two dimensions. The two example arrangements of the discharge portion of the air conduit may provide different bubble patterns for the fluid massage of the foot spa. As schematically shown in FIGS. 2A, 2B and 3, these openings are formed across a full thickness of the second body of plastic 18, such that the second body of plastic can be considered to be perforated. As such, the aforementioned figures illustrate that the discharge portion is fluidically communicated with an interior of the liner so as to discharge the pressurized air thereto.

As shown in, for example, FIGS. 2A and 2B, the air conduit 20 extends from the starting end to the discharge portion substantially within a thickness of the liner 10 which is measured between the outer face 16A of the first body of plastic and an exterior or outer face 18B of the second plastic body.

With the openings 26 in the second body of plastic 18, the first body of plastic 16 is imperforate from a location on the first plastic body at which the starting end 21 of the air conduit is disposed to the free end of the first plastic body that defines the top free end 14A of the peripheral liner wall. That is, with the exception of an aperture 27 in the first plastic body for passing the air discharge apparatus coupler therethrough for connecting to the air conduit 20, which is located at the top free end 14A of the liner wall above the typical waterline W of the soaking solution, the first body of plastic is imperforate across a remaining surface area thereof (both the outer and inner faces 16A, 16B thereof) so as to completely isolate the soaking solution containable by the liner from the soaking basin 2. In other words, the first body of plastic is imperforate in all directions across its surface from the aperture 27 in the first plastic body to the peripheral top free end of the liner wall. Note that the aperture 27 defines a predetermined starting location on the first body of plastic generally locating the starting end of the air conduit.

Further to the lack of openings or apertures in the first body of plastic, the coupling arrangement 22 provides an air-tight seal at a point of connection between the air conduit 20 and the air discharge apparatus 6. As shown in FIG. 2A, the coupling arrangement comprises a sealing gasket 22 such as an O-ring that is embedded in the first body of plastic 16 so as to be carried at the inner face 16B of the first plastic body by the first plastic body. The air discharge apparatus coupler, which carries a nozzle N on its end in the illustrated embodiment, may fit snugly through the sealing gasket 20 and deliver the pressurized air from the air discharge apparatus 6 into the air conduit 20.

FIG. 2B illustrates another arrangement of liner, and more specifically one in which a different coupling arrangement is employed. That is, in this liner arrangement of FIG. 2B the coupling arrangement comprises a flexible tube 22' which is coupled at the free end 14A of the two bodies of plastic so as to extend the air conduit 20 from the starting end 21 thereof to the supply location S of the air discharge apparatus, which may be presented on the top rim 4A of the peripheral basin wall. A sealing gasket is disposed at or adjacent a free end of the flexible tube 22', which is opposite the starting end 21 of the air conduit. The sealing gasket as illustrated in FIG. 2B is disposed in a closed end wall of the flexible tube. In other arrangements, the sealing gasket may be disposed in a circumferential peripheral wall of the flexible tube 22'. The flexible tube 22', where it is attached to the first and second bodies of plastic 16', 18 may be joined to the plastic bodies such as by heat sealing so that the flexible tube and plastic bodies are effectively unitary. In other arrangements, the flexible tube may comprise an extension of each of the first and second bodies of plastic that is sealed together to form the flexible tube. Also, it will be appreciated that in the arrangement as shown in FIG. 2B, the first body of plastic 16' is imperforate across its entire surface area. In this instance, the predetermined starting location on the first body of plastic for the starting end 21 of the air conduit is located along the free end 14A of the respective plastic body such that the starting location is defined by a portion of the edge of the plastic body.

Since the first and second bodies of plastic are flexible, circumferential or perimeter walls of the air conduit 20 are flexible. That is, a top portion of the walls of the air conduit is defined by an inner face 18A of the second body of flexible plastic, which forms the interface with the inner face 16B of the first body of plastic. Furthermore, a bottom portion of the walls of the air conduit is defined by the inner face 16B of the first body of flexible plastic. As such, a diameter of the air conduit 20, as measured between the inner faces 16B, 18A of the first and second bodies of plastic, is expandable in response to a pressure value of the pressurized air which is passed through the air conduit. That is, when no air is passed through the air conduit, the air conduit may be in a first contracted state with a small, first diameter value. When air from the air discharge apparatus 6 is passed through the air conduit, the air conduit may dilate from the first contracted state to a second dilated/expanded state with a larger, second diameter value. With increasing pressure of the pressurized air from the air discharge apparatus 6, the air conduit may further expand with respect to the second diameter value. As such, diameter of the air conduit 20 may change in size with the particular pressure value of the pressurized air from the air discharge apparatus, between a minimum diameter when no air is passed through the air conduit (as in the contracted state) to a maximum diameter attained at a particular pressure value (after which the air conduit's diameter no longer increases with rising pressure values which are larger than this particular pressure value).

Thus, through use of flexible plastics, sufficient pressure may be maintained along a length of the air conduit 20 so as to resist back pressure of the soaking solution and thus provide sustained transfer of the pressurized air from the air discharge apparatus 6, through the air conduit 20, and into the inside volume of the liner where the soaking solution may be contained.

Although the air conduit's diameter may vary in size depending on the pressure value of the air passed therethrough, the diameter of the air conduit 20 lies in a prescribed size range in order to provide the sustained transfer of the pressurized air throughout operation of the foot spa. The air conduit's diameter may lie in a first prescribed range between 1 and 25 millimetres for proper functionality. The diameter of the air conduit may also lie in a second prescribed range between 1.5 and 23 millimetres and provide similar functionality to the first prescribed range. Additionally, the diameter of the air conduit may lie in a third prescribed range between 2 and 20 millimetres and provide similar functionality to either one of the first and second prescribed ranges.

As alluded to earlier in this specification, the liner is suited for containing the soaking solution within the soaking basin as part of a pedicure treatment, in which the user's feet are soaked in the soaking solution for a prescribed period of time. The liner 10 provides isolation of the soaking solution from the soaking basin 2 and provides means for generating a fluid massage by releasing a stream of bubbles via an air conduit 20 formed in the liner 10.

In use, one such liner 10 is inserted into the soaking basin 2 of the foot spa so as to be installed therein. The first body of plastic 16 rests at or adjacent the inside face of the soaking basin 2, and the second body of plastic 18 is thus segregated from the inside face of the soaking basin by the first plastic body. Additionally, it is noted that the base floor 12 of the liner covers the inside face of the soaking basin at the bottom base 3 thereof and the peripheral liner wall 14 covers the inside face at the peripheral basin wall 4.

The liner is filled with the soaking solution to the typical waterline W, which is below the starting end 21 of the air conduit. The air discharge apparatus 6 is operated so as to deliver the pressurized air to the closed loop 24 through both supply branches 23A and 23B in parallel. Bubbles are discharged from the openings 26 in the closed loop 24 as the air passes from inside the air conduit 20 to the inside volume of the liner 10 where the soaking solution is contained. After use in the pedicure treatment, the liner 10 is removed from the soaking basin 2 and the soaking solution is emptied therefrom so that used liner can be discarded.

We now turn to the method of forming the liner of the illustrated liner arrangements in further detail. Each one of the first and second bodies of plastic 16, 18 have a respective surface area spanning across two opposite large faces of the plastic and a thickness measured therebetween. The large faces, indicated at 16A and 16B for the first plastic body and at 18A and 18B for the second plastic body, are delimited by a peripheral body edge 28. Furthermore, in the illustrated arrangements of FIGS. 4 and 5, each one of the large faces defines the respective one of the inner and outer face of the respective body of plastic 16, 18.

Figure 4:
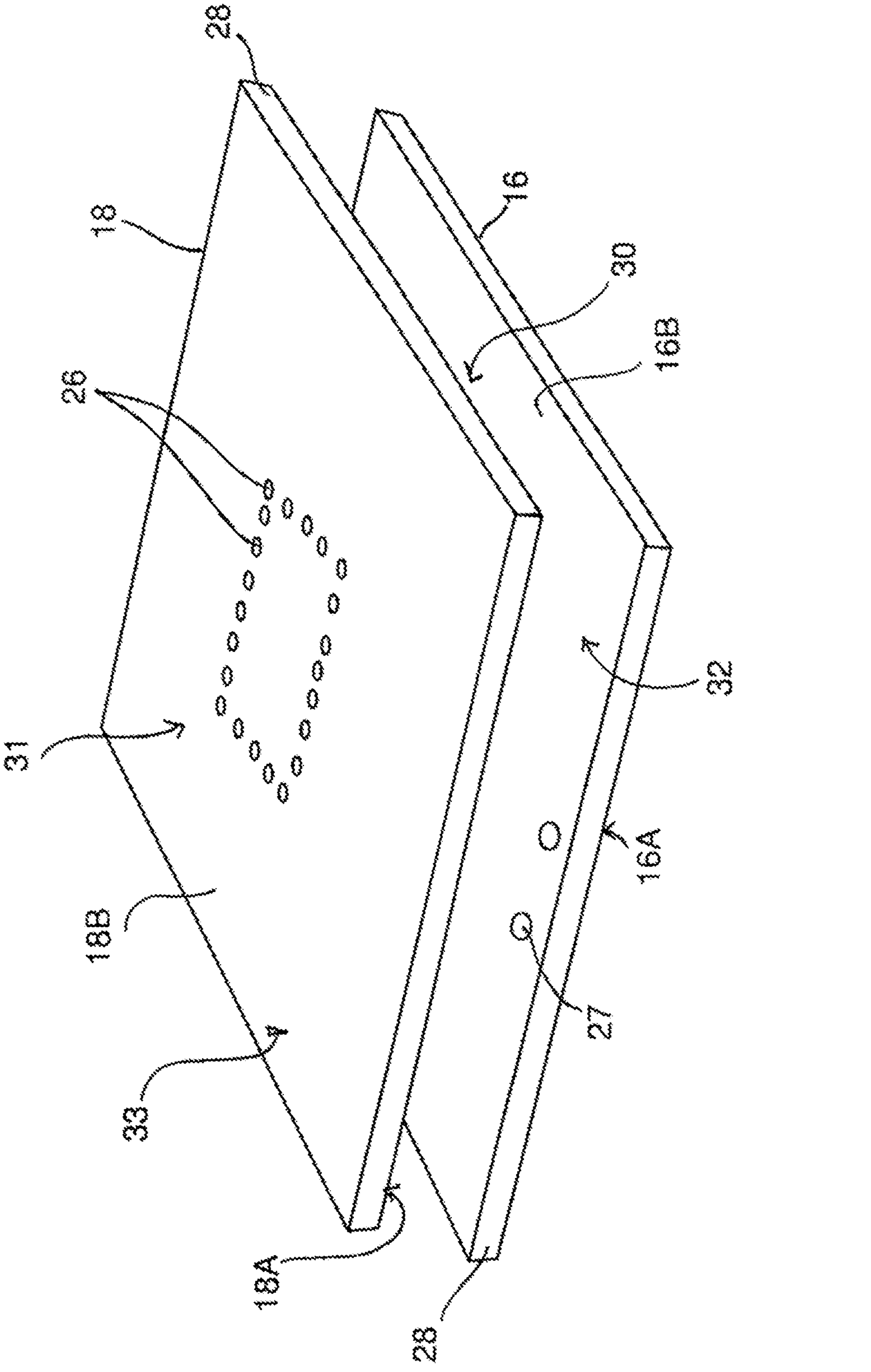
FIG. 4 is a perspective view of first and second bodies of plastic of liner where the bodies of plastic are shown separated from one another.
Figure 5:
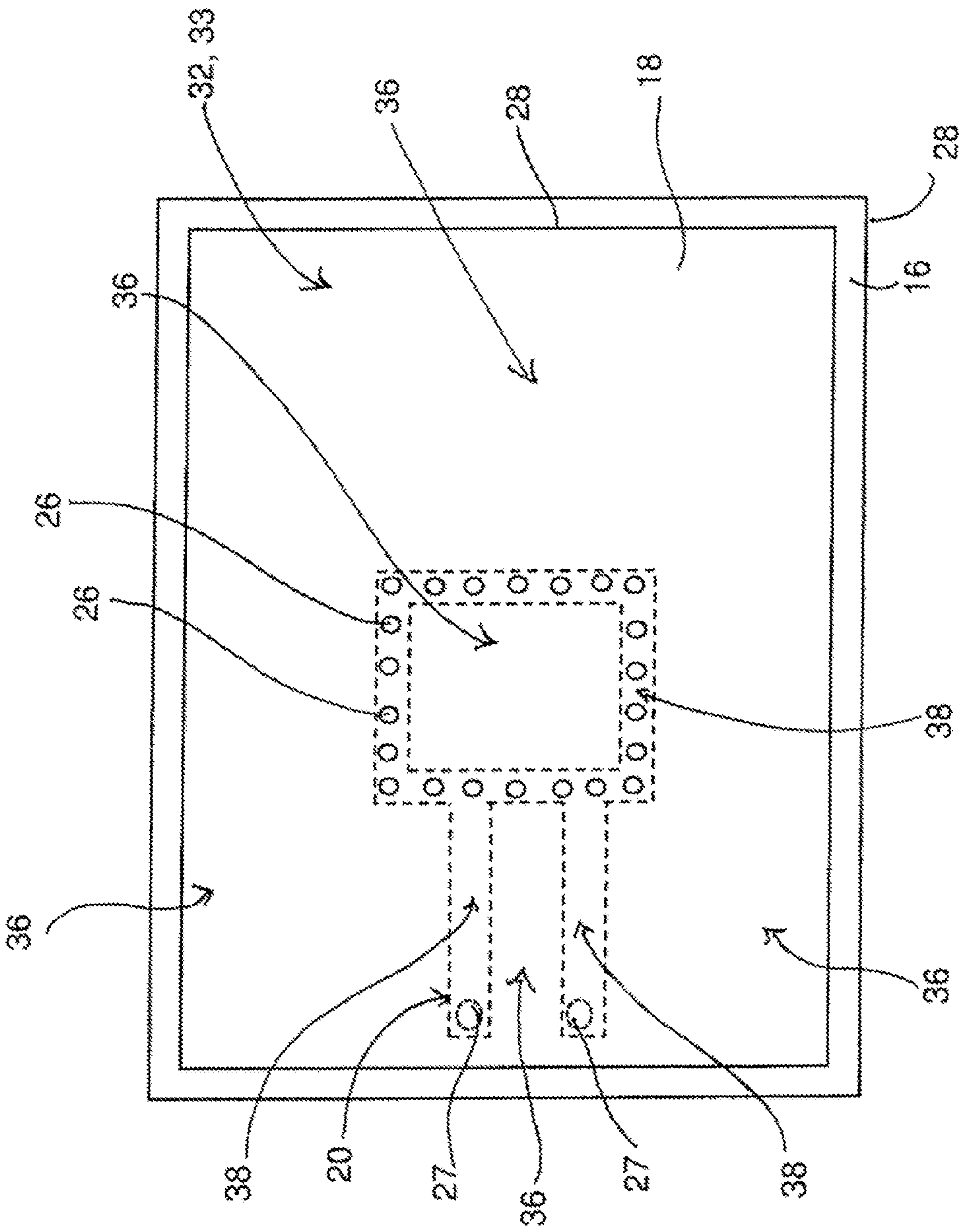
FIG. 5 is a top plan view of the first and second bodies of plastic of FIG. 4 where the bodies of plastic are shown overlaid one on top of the other so as to better illustrate treated and untreated areas of the bodies of plastic when they are joined together.

In the illustrated arrangement of FIGS. 4 and 5, each one of the first and second bodies of plastic 16, 18 also has a central body portion indicated at 30 and 31 respectively, which comprises a centrally located area of the respective body that is surrounded by a fringing body portion indicated at 32 and 33 respectively. The fringing body portion 32, 33 comprises a bordering area of the respective plastic body that encloses the central body portion 30, 31.

Additionally, in the illustrated arrangement of FIGS. 4 and 5, the first and second bodies of plastic are sized and shaped in a manner so as to be substantially uniform in size (i.e., equal in size to one another) and generally matching in shape. That is, the first and second bodies of plastic 16, 18 are identical in shape, and nearly identical in size such that the inner layer of the two (i.e., the second body of plastic 18 of the illustrated embodiment) is slightly smaller than the outer layer (i.e., the first body of plastic 16 of the illustrated embodiment).

Typically, the first and second bodies of plastic 16, 18 are provided ready-to-go, that is with the appropriate openings formed at the appropriate locations on the respective body. That is, the first body of plastic 16 has at least one aperture 27 (more specifically two apertures in the illustrated embodiment) formed across its full thickness and located in its fringing body portion 32. In the illustrated embodiment, the at least one aperture 27 is located at or adjacent a free end of the first plastic body, without intersecting the peripheral body edge 28 so that an amount of plastic is disposed in all directions around the respective aperture. Furthermore, the second body of plastic 18 has the plurality of openings 26 located in its central body portion 31.

When the first and second bodies of plastic are brought together before coupling together, the central body portions 30 and 31 of the two plastic bodies register with one another and the fringing body portions 32 and 33 of the two plastic bodies register with one another. That is, the corresponding one of the central body portion and the fringing body portion of one plastic body is aligned with that of the other plastic body, so that they overlap one another in their aligned configuration as better shown in FIG. 5.

Once in the aligned configuration, the first and second bodies of plastic are welded (in other words, fused) to one another at a first one of their respective faces 16B and 18A. To perform the welding, heat is used to melt the plastic bodies together, and the heat is applied according to a prescribed heating pattern. That is, the heat is applied to pre-specified areas 36 of each body of plastic where the bodies of plastic are intended to be joined together. For example, a heat applicator with suitable heating control, generally in the form of a heat gun, is brought in sufficiently close proximity to the bodies of plastic and is moved over the bodies of plastic according to the prescribed heating pattern; this heat applicator may be carried on a track system supported over a working area where the plastic bodies 16, 18 are placed such that the heat applicator is movable in a plane over the working area and computer controlled in order to apply the heat according the prescribed heating pattern. Untreated areas 38 of each body of plastic are thus free to separate from direct engagement with one another at their first faces 16B, 18A. These untreated areas 38 also register with the at least one opening 27 in the first body of plastic 16 and the plurality of openings 26 in the second of body of plastic 18. Thus, the untreated areas form a path disposed between the first faces 16B, 18A of the two bodies of plastic that spans from the at least one opening 27 in the fringing body portion 32 of the first body of plastic, which is located at or adjacent a common free end of the joined bodies of plastic, to the plurality of openings 26 in the central body portion 31 of the second plastic body. This path forms the air conduit 20 of the liner.

In particular, at the location on the first and second bodies of plastic where the respective aperture 27 in the first body of plastic is disposed, the two bodies of plastic are joined across the surface of their first faces 16B, 18A that is disposed between a periphery of the respective aperture and the peripheral body edge 28 of the plastic bodies so as to close the air conduit 20 in the area between the first faces of the bodies of plastic such that the respective aperture 27 defines the only passageway from outside the joined bodies of plastic into the air conduit 20.

As part of the manufacturing process, the first and second bodies of plastic are also arranged in a manner such that they can be formed into the receptacle having the base floor 12 and the upstanding peripheral liner wall 14. For example, the first and second bodies 16, 18 when joined together may be shaped into the form of the receptacle. The shaping of the first and second bodies may be fixed when the liner is made as the hard shell type, and the shaping may alternatively be pliable when the liner is made to be like a garbage bag. Regardless of the specific type of liner manufactured, the central body portions 30, 31 of the two plastic bodies form the base floor 12 and the fringing body portions 32, 33 form the peripheral liner wall 14. That is, the central body portions are located at the base floor, and the fringing body portions are located at the liner wall. Thus, the central body portions of the plastic bodies may extend up across a portion of the peripheral liner wall so as to occupy some area of the liner wall in some embodiments, and alternatively the fringing body portions may extend down across a portion of the base floor so as to occupy some area of the base floor in some other embodiments. Furthermore, with the at least one aperture 27 in the first body of plastic located at or adjacent its free end that defines the top free end 14A of the liner wall, the at least one opening is therefore located near a top of the soaking basin 2 as better shown in FIG. 2 so as to be at or above the typical waterline W of the soaking solution. According to this arrangement, the untreated areas 38 extend from a location at or adjacent the top free end 14A of the peripheral liner wall 14 that is defined by the common free end of the joined plastic bodies, and across the peripheral liner wall to the base floor where the untreated areas form the closed loop 24 thereat.

Additionally, for the appropriate arrangement, a sealing gasket 22 is embedded in the first body of plastic 16 such that the sealing gasket is carried at the first face 16B thereof. The sealing gasket provides an air-tight seal for the air discharge apparatus coupler when same is communicated with the air conduit 20.

In the other arrangement of the liner as shown in FIG. 2B, the flexible tube 22' is held in abutting engagement with the free end 14A of the two plastic bodies 16, 18 and thus welded using heat to the free end 14A in the abutting engagement therewith.

Figure 2C:
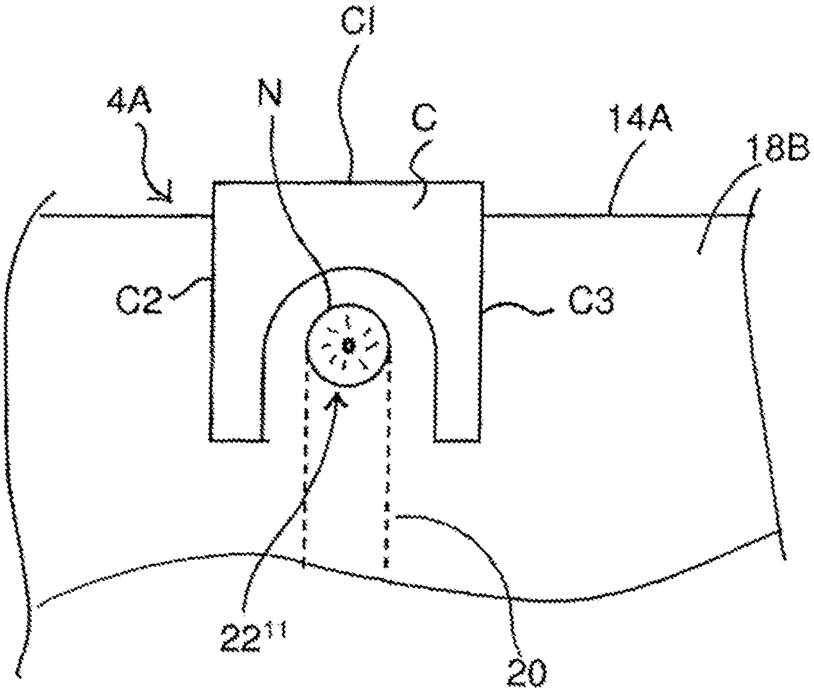
FIG. 2C is a schematic illustration of a further arrangement of liner showing only a portion of the liner in the vicinity of a coupler of an air discharge apparatus, where the coupler is shown as if a portion of the liner otherwise covering same is cutaway for clarity of illustration.

In a further arrangement shown in FIG. 2C, the coupling arrangement of the liner includes an aperture 22" in the first body of plastic which is not reinforced by any additional element such as the sealing gasket. The air discharge coupler nozzle N is passed through this aperture 22", and to create a seal thereat there is provided a clip C which engages the liner at an inside face thereof that is defined by the exterior face 18B of the second body of plastic 18. It will be appreciated that the nozzle N defines a fluidic coupler of the air discharge apparatus which enables transfer of the pressurized air into the air conduit of the liner. It is at the fluidic coupler where the pressurized air leaves the air discharge apparatus for entry into the air conduit.

In the illustrated arrangement, the clip C which defines a coupling element for interconnecting the air conduit with the air discharge apparatus is substantially U-shaped so as to extend from a position above the aperture 22" near the top edge 14A of the liner to a position on either side of the aperture that is alongside the aperture longitudinally of the air conduit 20 (shown in dashed line) near the starting end. More specifically, the U-shaped clip C comprises a base Cl and a pair of legs C2 and C3 interconnected by the base and extending therefrom at a location above the aperture of the installed liner, and typically over the top edge 14A, to spaced-apart distal ends of the legs C2, C3 located on either side of the air conduit 20 below the aperture 22" so as to provide a seal around the whole periphery thereof. Each leg C2, C3 defines an engaging surface on a common side of the leg pair for contacting the exterior face 18B of the second body of plastic. The clip C is operatively connectable to the basin in a working position in which an area of the bag liner around the aperture 22" is pinched between the inside face of the basin and the engaging surfaces of the legs C2, C3 which are in contact with the exterior face 18B of the second body of flexible plastic, so as to form a seal between the fluidic coupler of the air discharge apparatus and the starting end of the air conduit. That is, in the working position the coupling element C is pinching the full thickness of the bag, which is between the outer face 16A of the first plastic body and the exterior face of the second plastic body 18B, with the pinched area substantially encompassing the aperture 22" and extending from one side of the air conduit, about the aperture and to the other side of the air conduit. The distal ends are located on either side of the air conduit so as not to obstruct the same and impede airflow therethrough. The clip C may be hingedly connected to the top rim 4A of the spa basin so as to be removably securable around the aperture 22" of the liner for creating the seal.

Generally speaking, the coupling arrangement of the illustrated arrangements of liner comprises an aperture formed in the liner so that the air discharge apparatus 6 at the coupler and the air conduit at the aperture can be communicated.

Figure 6:
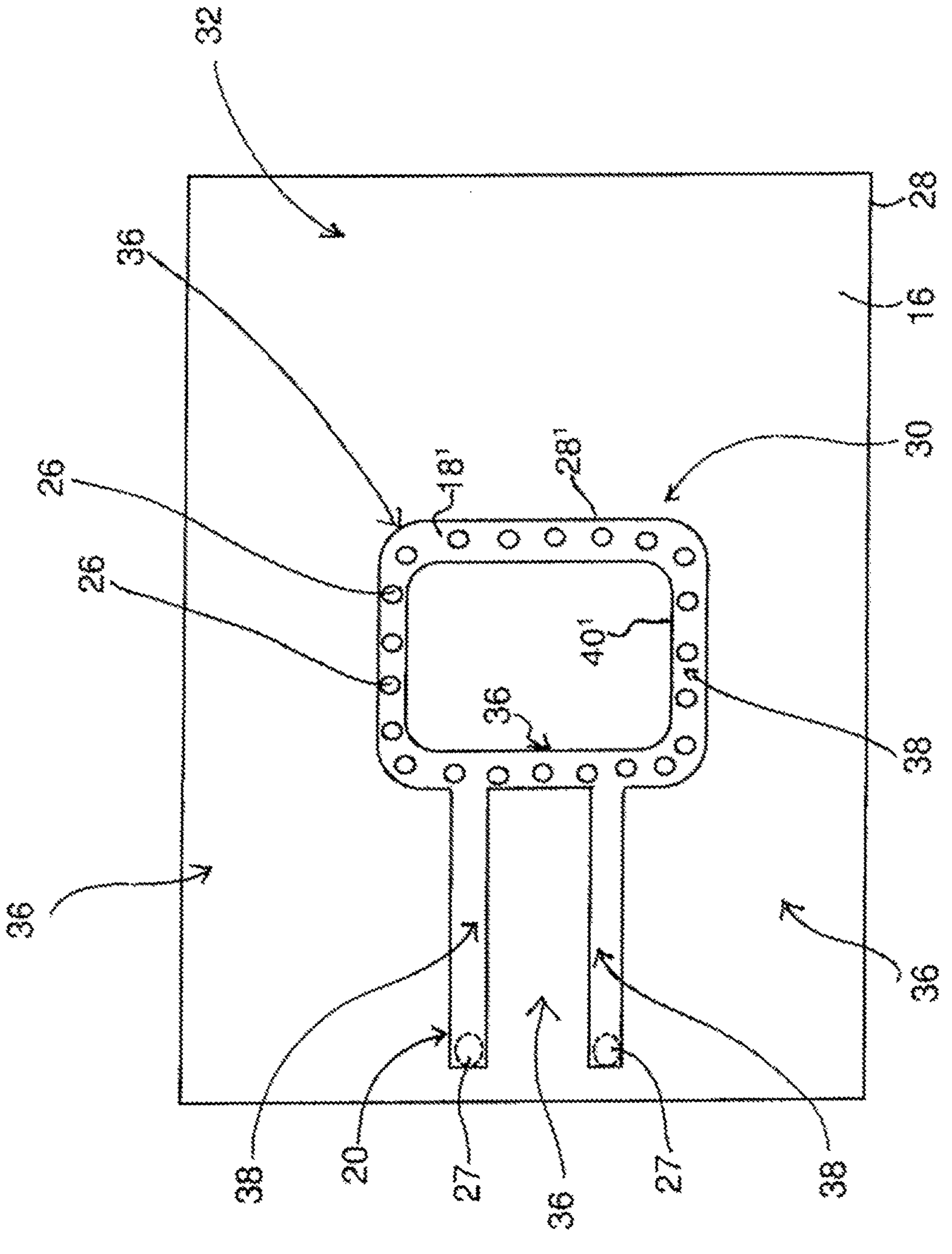
FIG. 6 is a top plan view like that in FIG. 5 but of another arrangement of first and second bodies of plastic where the bodies of plastic are sized substantially differently in size.

FIG. 6 shows an alternate arrangement in which the second body of plastic 18', which locates the openings 26, is shaped to have an outer periphery 28' which generally follows a path of the air conduit 20. In this alternate arrangement, the second body of plastic 18' includes an inner periphery 40' which follows an inner perimeter of the air conduit at the closed loop 24. Thus, the second body of plastic 18' is sized in its surface area so as to cover the air conduit 20 with minimal overlap with the first face of the first body of plastic 16. Thus, the interface I between the first and second bodies of plastic that defines the pre-specified areas to which heat is to be applied is limited to that along the outer and inner peripheries 28', 40' of the second body of plastic at the second body's first face 18A. The minimal overlap is enough to form a suitable weld connection between the two bodies of plastic so that the air conduit is sealed along the outer and inner peripheries of the second plastic body. As such, a remaining surface area of the first plastic body's first face 16B including portions of the central body portion 30 thereof and the fringing body portion 32 thereof is left uncovered by the second body of plastic so as to be exposable to the soaking solution. It will be appreciated that the air conduit 20 traverses an area across the surface area of the first body of plastic 16 which is typically much smaller than same. That is, an overall area over which the air conduit spans, even if that delimited by the closed loop 24 is included within the overall area, is smaller than the surface area of the first plastic body such that there a portion of the first plastic body's surface area remains uncovered by the second plastic body 18'.

Note that in alternative embodiments, the liner may include more than two bodies of plastic forming more than two layers of the liner. For example, an additional body of plastic may be joined to the outer face 16A of the first plastic body of the illustrated embodiment so as to form an outer layer in relation thereto. This additional body of plastic may be imperforate in a similar manner as the first body of plastic of the illustrated arrangements. That is, with the exception of an aperture in the additional body of plastic for passing the air discharge apparatus coupler therethrough, the additional body of plastic is imperforate from a location thereon at which the starting end of the air conduit is disposed to the free end of the additional plastic body that defines the top free end 14A of the peripheral liner wall. In another example, an auxiliary plastic body may be provided so as to be joined to the outer face 18B of the second body of plastic of the illustrated embodiment that is opposite the second plastic body's inner face 18A. The auxiliary plastic body has openings formed across its full thickness and aligned with the openings 26 of the second plastic body of the illustrated embodiment so that the pressurized air passes from the air conduit 20, through the openings 26 in the second body and through the openings in the auxiliary plastic body to the inside volume of the liner receptacle.

Figure 7:
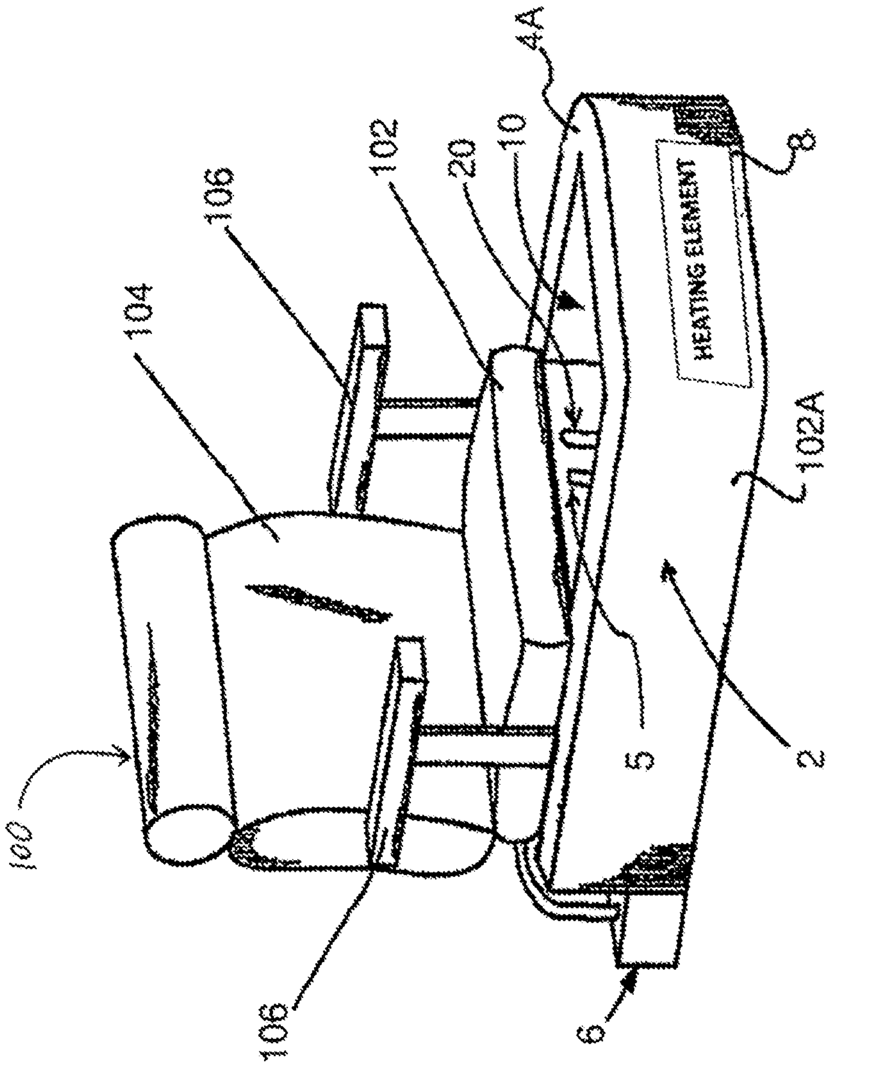
FIG. 7 is a perspective view of a spa chair comprising a foot spa and liner.

Furthermore, it will be appreciated that the soaking basin 2 is typically used in combination with a seat 100 receiving a patient of the pedicure treatment in seating position thereon with the feet of the patient presented forwardly of the seat. The soaking basin 2 is located in front of the seat 100 such that the feet of the patient are received therein. The soaking basin and seat may be integrated together in the form of a spa chair 102, like that illustrated in FIG. 7, which includes a backrest 104 and arm rests 106. FIG. 7 shows the air discharge apparatus 6 disposed externally of an enclosure 102A of the spa chair and suitable tubing stemming from the air discharge apparatus to deliver the air to the supply location S. However, in other arrangements the air discharge apparatus may be contained within the enclosure 102A.

As described herein, the liner for use with a basin to contain a liquid features two bodies of flexible plastic which are joined at adjacent faces of the distinct plastic bodies so as to form an interface of the plastic bodies. The liner includes an air conduit adapted for guiding pressurized air substantially within the thickness of the bag from an air discharge apparatus, which generates the pressurized air, to the interior of the liner. A length of the air conduit is formed at the interface of the plastic bodies such that a circumferential wall of the length of the air conduit is defined in part by an inner face of each plastic body. The plastic body of the liner that is arranged to contact an inside face of the basin is substantially imperforate so as to isolate the liner interior, where the liquid is received, from the basin.

Also as described herein, one aspect of the present invention relates generally to a coupling element for use with a flexible bag-type liner arranged in a basin to contain a liquid comprises a pair of interconnected legs with distal ends which are spaced from one another. The liner has an air conduit which is connectable to a fluidic coupler of an air discharge apparatus of the basin that supplies pressurized air for discharge into the liquid. The coupling element is operatively mountable to the basin in a working position in which an area of the liner around an aperture which receives the fluidic coupler is pinched between the inside face of the basin and the legs which are in contact with the interior of the liner, so as to form a seal between the coupler and the starting end of the air conduit.

Figure 8:
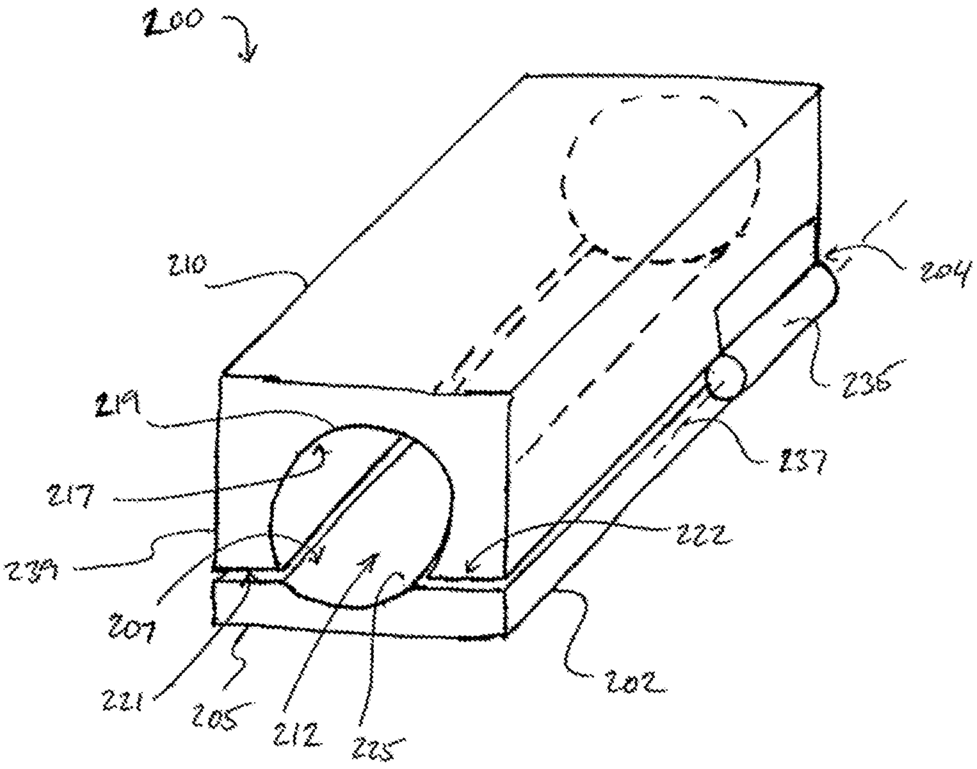
FIG. 8 is a perspective view of an arrangement of clamping device, according to the present invention, for securing a discharge end of a gas discharge apparatus inside a gas delivery conduit of a liner.

Referring to the remaining starting from FIG. 8, there is shown a device indicated at 200 for securing a discharge end 6A of a gas discharge apparatus 6, which is for example a nozzle configured to controllably discharge a gas such as air, inside a gas delivery conduit 20 of a fluid impermeable liner 10 that is covering a basin 2 for containing liquid. As such, the discharge end 6A is arranged in spaced relation to a surface of the basin such that the gas delivery conduit of the liner can be received over the discharge end 6A so as to circumferentially envelop or surround the same. The discharge end 6A is generally supported on a conduit such as tubing or hose or piping, which may be flexible or substantially rigid, that conveys gas such as air from the gas discharge apparatus acting as a source of a flow of gas subsequently guided by the tubing, hosing or piping to the discharge end 6A for discharge.

In such a liner 10, the gas delivery conduit 20 is configured to convey the gas to a discharge portion of the liner generally indicated at 24, which is configured to release the gas to an interior IB of the liner-covered basin. Thus the device 200 acts to substantially form a fluidic seal between the discharge end 6A of the gas discharge apparatus and the liner 10 so that the gas emitted by the discharge apparatus 6 is effectively transferred to the liner 10 for subsequent release to the liquid contained in the covered basin.

To form the fluidic seal, the device 200 comprises a first base portion 202 which is configured to be supported on the basin 2 so as to engage an outer face 16A of the liner 10. The base portion 202 extends longitudinally from a first end 204 to a second end 205 and defines on one face 207 thereof, delimited between the ends 204 and 205, a generally planar surface which faces away from the adjacent basin surface. It is at this face 207 that the base portion 202 makes contact with the liner 10, as will be better appreciated shortly.

For cooperating with the base portion 202 there is provided a second replaceable portion 210 of the device, which is configured to be movable relative to the base portion 202 to selectively engage an inner face 18B of the liner in opposite relation to the first portion 202 in a working position of the device. In the working position, the base and replaceable portions of the device 202, 210 are configured to cooperatively form a generally tubular cavity 212 substantially encompassing the gas delivery conduit 20, to clamp the gas delivery conduit 20 over the discharge end 6A of the gas discharge apparatus to substantially form the fluidic seal therebetween.

The second replaceable portion 210 extends longitudinally from a first end 214 to a second end 215 and defines an inner face 217 arranged for facing the base portion 202 in the working position, and which defines a portion of the tubular cavity 212 of the working position. The inner face 217 of the replaceable portion 210 forms a longitudinally extending groove 219 that spans the full length of the replaceable portion so as to be open at each end 214, 215 of the second replaceable portion 210. On either side of the groove 219 the inner face 217 provides contact transversely opposite contact surfaces 221 and 222 for engagement with the base portion 202 at transversely spaced locations thereon in the working position, between which the tubular cavity 212 is formed. As such, a generally transversely central portion of the inner face 207 of the base portion 202 defines a cavity-forming portion 225 of the inner face's surface.

The second replaceable portion 210 is thus distinct from the first base portion 202 so that it can be moved from the cavity-forming working position to an open position in which the second replaceable portion 210 and the base portion 202 are in suitably spaced relation from one another, particularly at their otherwise oppositely facing inner faces 207 and 217, to enable placement of the gas delivery conduit 20 of the liner along the first base portion 202 before surrounding the same by locating the replaceable portion 210 over the gas delivery conduit 20.

In the illustrated arrangements, the second replaceable portion 210 as a whole is substantially channel shaped. Furthermore, the second replaceable portion 210 of the illustrated arrangements forms a majority of the circumference of the tubular cavity 212 in comparison to the base portion.

The tubular cavity 212 which is open at either end of the device 200 is collectively formed by the inner faces 207 and 217 of the first and second portions, and more particularly transversely central portions of these faces so as to provide on either side thereof contact surfaces which substantially touch or come close to touching only to be separated by a pinched thickness of the liner, so that a wall defining the conduit is pressed against the discharge end 6A substantially around the full periphery or circumference of the discharge end. The tubular cavity 212 is open at either end to permit at one end passage of conduit carrying the discharge end 6A into the tubular cavity 212, and at the opposite end to permit passage of the air conduit of the liner without constricting same so as not to obstruct the flow of gas along the air conduit. The seal is thus forming within the cavity 212 at a common longitudinal location where the cavity registers with both the discharge end 6A and the gas conduit 20 of the liner.

Figure 9:
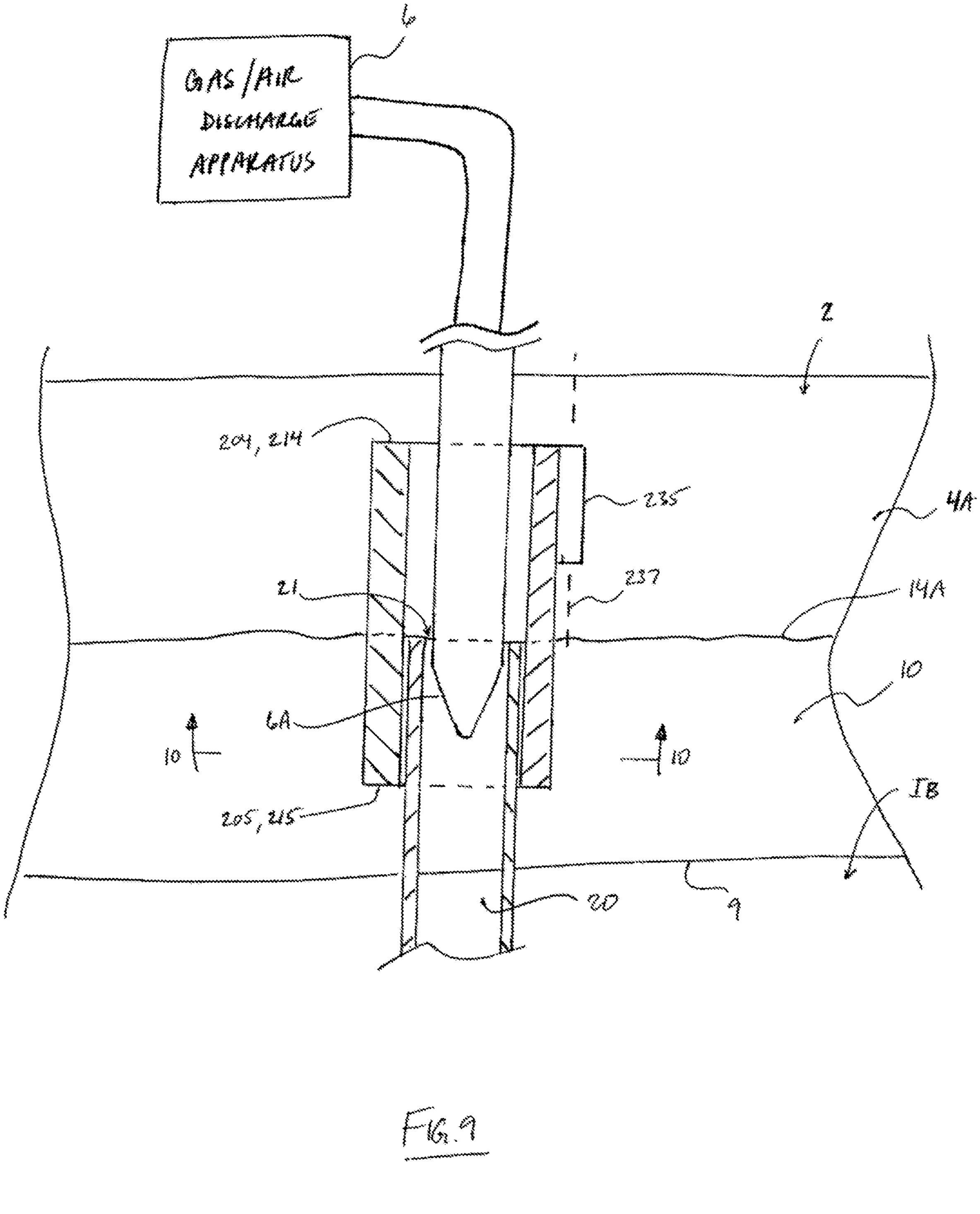
FIG. 9 schematically shows a longitudinal cross-sectional view of the device of FIG. 8 with the liner received therein, and further, the discharge end of the gas discharge apparatus inserted into the gas delivery conduit of the liner.
Figure 10:
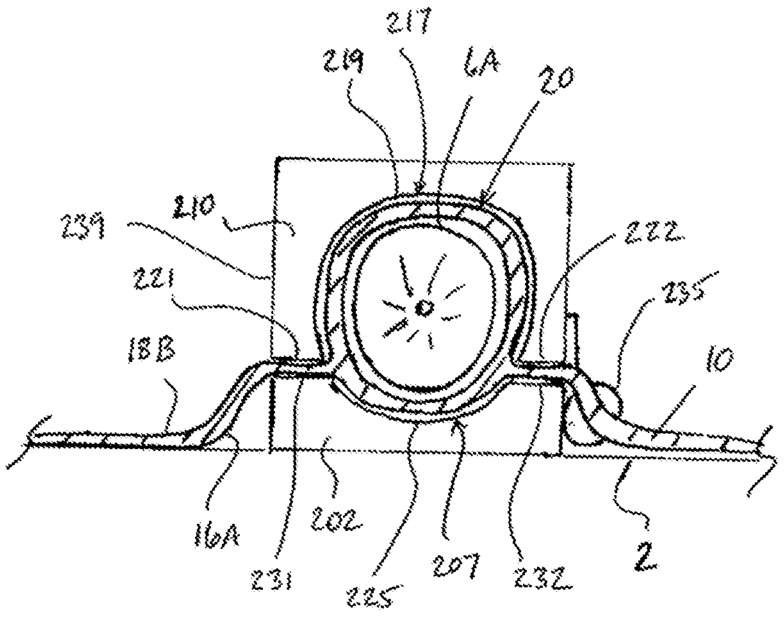
FIG. 10 schematically shows a transverse cross-sectional view taken along line 10-10 in FIG. 9, with hatching of some components omitted for clarity of illustration.

In a first of two illustrated arrangements of securing device which is that indicated at 200, and shown in FIGS. 8-10, the first base portion 202 is a distinct component from the basin 2 that is mounted to a surface of the basin such as at the rim 4A thereof. Thus the inner face 207 of the base portion is spaced from the basin surface by a thickness of the base portion 202.

The base portion 202 of the first arrangement comprises a substantially planar pad which is mounted on the rim 4A of the basin to present the inner face 207 facing upwardly. The cavity-forming portion 225 of the base portion's inner face 207 is recessed from its transversely opposite sides 231, 232 along the full length of the base portion 202, so as to be shaped to define a depression in the base portion. The depression 225 in the base portion 202 is less deep than the groove 219 formed by the second replaceable portion 210.

Furthermore, in the first illustrated arrangement 200, the second replaceable portion 210 is hingedly connected to the first base portion 202 at 235 to be pivotally movable about an axis 237 between the working position and the open position. In the first arrangement, a side 240 of the second replaceable portion that is distal to the axis 237 is in spaced relation to the first base portion 202.

Figure 11:
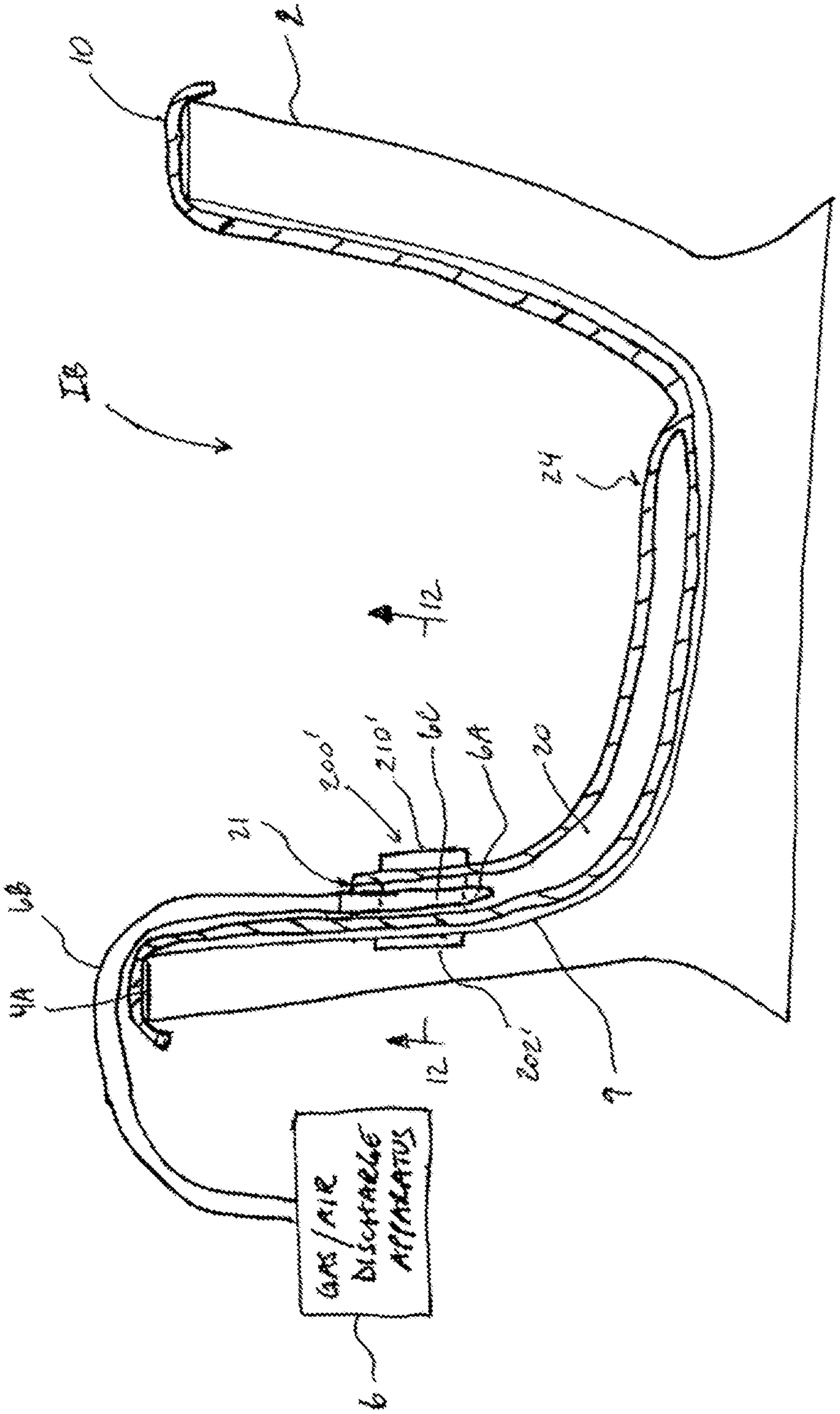
FIG. 11 schematically shows a cross-sectional view of basin with a liner covering an interior of same, and a second arrangement of clamping device according to the present invention, with hatching of some components omitted for clarity of illustration.
Figure 12:
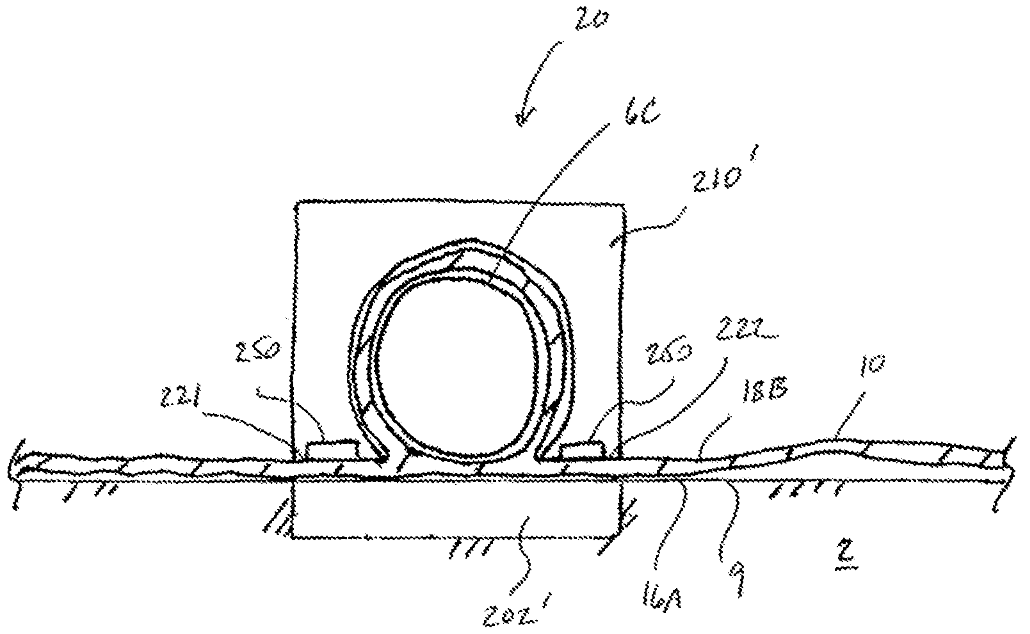
FIG. 12 schematically shows a transverse cross-sectional view taken along line 12-12 in FIG. 11, with hatching of some components omitted for clarity of illustration.

The hinge 235 is disposed closer to one end 204 than the other 205 and supports the replaceable portion 210 in slightly spaced condition to the base portion 202 in the working position to form a sufficient gap to permit passage of a thickness of the liner therebetween. This is particularly suited when the gas delivery conduit 20 of the liner 10 defines a supply opening 21 configured to receive the discharge end 6A of the gas discharge apparatus, where the gas conduit commences, which is exposed at the inner face 18B of the liner, such that liquid filled to a sufficient height may be able to enter the gas delivery conduit. In such arrangements of liner 10, the gas air conduit extends to the peripheral edge 14A of the liner which is draped over the basin rim 4A, so as to reduce likelihood of water inadvertently entering the gas delivery conduit 20. It will be appreciated that the plastics material used of the liner is normally in the form of a thin transparent film, and hence in FIG. 9 an interior surface 9 of the basin In a second of the two illustrated arrangements of securing device indicated at 200', which is shown in FIGS. 11-12, the first base portion 202' is integral with the basin 2 so as to be embedded in the surface 9 thereof. Thus the inner face 207 of the first portion is substantially flush with the basin surface 9.

Instead of being hingedly connected, the first and second portions 202' and 210' are configured to magnetically interconnect when arranged in the working position to form the tubular cavity 212, for example by carrying magnetic elements 250 configured to generate magnetics fields which attract one another, such as such as permanent magnets. The second replaceable portion 210' carries magnetic elements 250 at each contact surface 221, 222 of its inner face 217, where the liner is pinched between opposite portions 202' and 210'. In the illustrated arrangement, the whole of the base portion 202' is magnetic for attracting the magnetic elements of the replaceable portion 210'.

Furthermore, in the second arrangement of clamping securement device 200' the second portion 210' is wholly separable from the first portion 202' such that in the open position the two portions are completely disconnected. This is particularly useful when the seal between the discharge end 6A and the liner conduit 20 is to be formed at an intermediary location on the liner spaced from the peripheral edge 14A thereof, as shown in FIG. 11, such as at the interior face 9 of the basin.

When the seal is to be formed at the interior face 9 of the basin, which substantially defines a volume of the liquid which is containable in the basin, as this is where the supply opening 21 of the conduit 20 is located, the discharge end 6A of the gas discharge apparatus is carried on a longitudinally extending tube 6B arranged to extend from a location outside the interior IB of the basin and into the interior IB such that the tube 6B is insertable into the gas delivery conduit 20 to extend at least partially along the gas delivery conduit to resist relative movement of the liner transversely to the tube. In this arrangement, the gas delivery conduit 20, which is flexible such that it is not have a predefined shape, and which attains shape when pressurized, is sized so as to be openable to a circumference substantially equal to that of the tube 6B. This at least partially resists the relative transverse movement between the discharge end 6A and the liner, since the replaceable portion 210' is presented at a location where it may be inadvertently contacted by a user's and consequently dislodged from the working position. As the liner 10 is flexible, the discharge end 6A of the gas discharge apparatus, to be received inside the gas delivery conduit, comprises a rigid body 6C defining the terminus of the discharge end to further resist the aforedescribed relative movement.

In use, the clamping or enclosure device is arranged in the open position in which there is formed sufficient space between the cooperating portions, one of which at 202 or 202' is mounted to the basin 2 to be supported thereby and the other at 210 or 210' which is supported by the first portion, so as to permit passage of the liner into the space so as to align the gas delivery conduit 20 of the liner generally transversely centrally of the base portion.

Typically, the clamping device is oriented on the basin surface generally in an outward direction of the basin relative to a central location of the basin interior, where a drain of the basin is normally located, such that the end defined by 204, 214 of the two portions, through which the discharge end 6A insertably passes into the cavity 212, forms an outer end of the clamping device and the end defined by 205, 215, through which the supply opening 21 of the gas conduit insertably passes into the cavity 212, forms an inner end of the clamping device.

The discharge end 6A is inserted into the liner's gas delivery conduit 20 so as to fluidically couple the gas discharge apparatus 6 and the liner.

The replaceable portion 210 or 210', which is replaceable relative to the base portion 202 or 202' when moved between the working position and the open position, is then arranged in the working position of the device relative to the already fixedly located base portion 202 or 202', to form the seal between the gas delivery conduit 20 and the gas discharge end 6A inserted therein. The seal is achieved by circumferentially surrounding the gas conduit 20 to effectively sandwich the portion of the liner defining same between the discharge end 6A and the device.

As such, assuming matching cross-sectional shapes of the tubular cavity 212 formed by the clamping device in the working position and the discharge end 6A, the tubular cavity 212 is sized slightly larger than the discharge end 6A at its largest diameter so that a thickness of the wall of the liner defining the gas conduit 20 can be suitably tightly pinched between the clamping device 200 on an outer side thereof and the discharge end 6A of the gas discharge apparatus on an inner side of the conduit wall.

Figure 13:
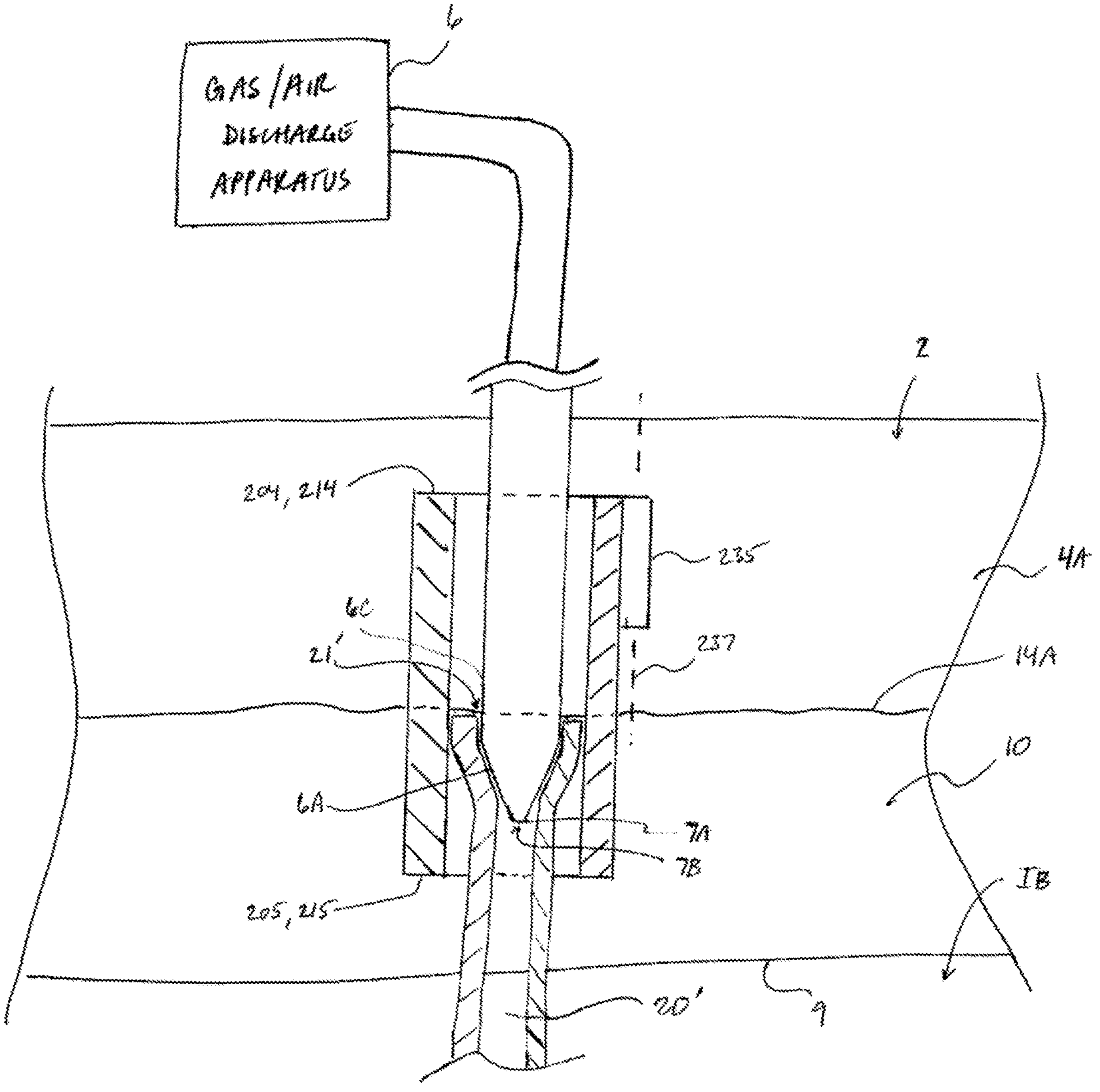
FIG. 13 is similar to FIG. 9 but showing another arrangement with different relative proportions of liner gas delivery conduit to discharge end of gas discharge apparatus.

FIG. 13 shows another arrangement in which an opening defined by starting end 21' of gas delivery conduit 20' is sized diametrically smaller than discharge nozzle 6A of the gas discharge apparatus 6, or in other words, the nozzle 6A is sized diametrically larger than the starting end of the 20'. The gas discharge conduit 20', which is diametrically elastic, which in the illustrated arrangement is due to its constituent material, thus can be stretched over the discharge nozzle 6A to form a fluidic seal therebetween. The seal can function independently of or in conjunction with the device 200, such that the stretched end of the conduit over the nozzle alone is sufficient for fluidic sealing to effect transmission of gas from the discharge apparatus to the liner's delivery conduit 20'.

It will be appreciated that the discharge nozzle 6A is tapered from a free end or tip 7A, which locates a discharge opening 7B configured to release the gas, to a base 7C of the nozzle, which is diametrically enlarged relative to the free end 7A and where the nozzle 6A connects to a delivery line 6B configured to convey the gas. Between the free end 7A and the enlarged base 7C, the nozzle comprises an outer surface 7D which is generally conical shaped, such that the nozzle is tapered from its base to the end or tip 7A. The free end 7A is sized smaller in diameter than a diameter of the opening at the supply end 21' of the conduit in a relaxed condition, that is an unstretched condition. Thus, by inserting the nozzle 6A into the conduit 20, the starting end 21' of the conduit 20' is stretched. Elasticity of a peripheral wall of the conduit acts to retain the stretched conduit on the nozzle.

In the illustrated arrangement, the gas delivery conduit 20' has substantially uniform interior cross-section from the starting end 21 to the discharge portion.

According to the arrangement of FIG. 13, a method of delivering gas to the liner, and in turn to the interior of a liner-covered basin, includes a method for securing a discharge nozzle of a gas discharge apparatus inside a gas delivery conduit of the liner, which securing method includes:

stretching the gas delivery conduit 20' over the discharge nozzle 6A therein to form a fluidic seal therebetween; and optionally, clamping the stretched gas delivery conduit over the nozzle using a device, such as 200, configured to form a generally tubular cavity around the nozzle with the gas delivery conduit received thereover, so as to enhance the fluidic seal.

The nozzle, which is substantially rigid, provides a relatively rigid clamping surface to act opposite the device 200 which also is substantially rigid in order to pinch or sandwich a compressible peripheral wall of the gas delivery conduit therebetween.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A device for securing a discharge end of a gas discharge apparatus configured to discharge a gas inside a gas delivery conduit of a fluid impermeable liner for covering a basin for containing liquid, wherein the discharge end of the gas discharge apparatus is configured to be connected to the gas delivery conduit, wherein the liner has an outer face for engaging the basin and an inner face for delimiting the interior of the liner-covered basin, the device comprising:

- a first portion configured to be fixedly supported on a mounting surface of the basin so as to engage the outer face of the liner, wherein the first portion has an inner face arranged to face away from the mounting surface of the basin and configured to engage the outer face of the liner, wherein the inner face of the first portion has a longitudinally extending depression and transversely opposite contact surfaces on either side thereof and lying in a common plane, wherein the depression is recessed from the contact surfaces relative to a depth direction transverse to both longitudinal and transverse directions of the device;
- a second portion configured to be movable relative to the first portion to selectively engage the inner face of the liner in opposite relation to the first portion in a working position, wherein the second portion has an inner face arranged to face the inner face of the first portion in the working position, wherein the inner face of the second portion has a longitudinally extending groove and transversely opposite contact surfaces on either side thereof and lying in a common plane, wherein the groove is recessed from the contact surfaces of the second portion in the depth direction;
- wherein the depression of the first portion and the groove of the second portions are configured to cooperatively form, in the working position, a generally tubular cavity for substantially encompassing the gas delivery conduit to clamp the gas delivery conduit over the discharge end of the gas discharge apparatus to substantially form a fluidic seal therebetween, wherein, in the working position, the respective contact surfaces of the first and second portions are in opposed relation for receiving the liner therebetween.

2. The device of claim 1 wherein the second portion is hingedly connected to the first portion to be pivotally movable about an axis between the working position and an open position in which a side of the second portion distal to the axis is in spaced relation to the first portion.

3. The device of claim 1 wherein the first and second portions are configured to magnetically interconnect when arranged in the working position.

4. The device of claim 3 wherein the second portion is wholly separable from the first portion.

5. The device of claim 1, in combination with the liner, wherein the gas delivery conduit of the liner defines an opening configured to receive the discharge end of the gas discharge apparatus that is exposed at the inner face of the liner.

6. The device of claim 5, in further combination with the gas discharge apparatus, wherein the opening of the gas delivery conduit of the liner is arranged to be located at an interior face of the basin substantially defining a volume of the liquid which is containable in the basin, and the discharge end of the gas discharge apparatus is carried on a longitudinally extending tube arranged to extend from a location outside the interior of the basin and into said interior such that the tube is insertable into the gas delivery conduit to extend at least partially along the gas delivery conduit to resist relative movement of the liner transversely to the tube.

7. The device of claim 6 wherein the liner is flexible and the discharge end of the gas discharge apparatus, to be received inside the gas delivery conduit, comprises a rigid body.

8. The device of claim 1 wherein the first portion is arranged to be supported on a rim of the basin outside the interior of the basin where the liquid is containable.

9. A method for using the device of claim 1, comprising:

- inserting the impermeable liner into the basin with the outer face engaging the basin and the inner face delimiting the interior of the liner-covered basin;
- securing a discharge nozzle of a gas discharge apparatus to the gas delivery conduit of the fluid impermeable liner;
- stretching the gas delivery conduit over the discharge nozzle; and
- clamping the stretched gas delivery conduit over the discharge nozzle within the generally tubular cavity using the first and second portions thereby forming a fluid seal therebetween.

10. A spa chair, comprising:

- a base arranged for resting on a support surface;
- a seat mounted on the base;
- a soaking basin mounted in front of the seat, the basin for containing liquid;
- a gas discharge apparatus configured to discharge a gas inside a gas delivery conduit of a fluid impermeable liner covering the basin, wherein the liner has an outer face for engaging the basin and an inner face for delimiting the interior of the liner-covered basin, the gas delivery apparatus having a discharge end configured to be connected to the gas delivery conduit of the liner;
- a securing device for securing the discharge end to the gas delivery conduit of the liner, the securing device comprising:
  - a first portion fixedly supported on a mounting surface of the basin so as to engage an outer face of the liner configured to engage the basin, wherein the first portion has an inner face facing away from the mounting surface of the basin and configured to engage the outer face of the liner, wherein the inner face of the first portion has a longitudinally extending depression and transversely opposite contact surfaces on either side thereof and lying in a common plane, wherein the depression is recessed from the contact surfaces relative to a depth direction transverse to both longitudinal and transverse directions of the device;
  - a second portion configured to be movable relative to the first portion to selectively engage the inner face of the liner in opposite relation to the first portion in a working position, wherein the inner face of the liner is for delimiting the interior of the liner-covered basin, wherein the second portion has an inner face arranged to face the inner face of the first portion in the working position, wherein the inner face of the second portion has a longitudinally extending groove and transversely opposite contact surfaces on either side thereof and lying in a common plane, wherein the groove is recessed from the contact surfaces of the second portion in the depth direction;

wherein the depression of the first portion and the groove of the second portions are configured to cooperatively form, in the working position, a generally tubular cavity for substantially encompassing the gas delivery conduit to clamp the gas delivery conduit over the discharge end of the gas discharge apparatus to substantially form a fluidic seal therebetween, wherein, in the working position, the respective contact surfaces of the first and second portions are in opposed relation for receiving the liner therebetween.

11. The spa chair of claim 10, wherein the second portion is hingedly connected to the first portion to be pivotally movable about an axis between the working position and an open position in which a side of the second portion distal to the axis is in spaced relation to the first portion.

12. The spa chair of claim 10, wherein the first and second portions are configured to magnetically interconnect when arranged in the working position.

13. The spa chair of claim 10, wherein the second portion is wholly separable from the first portion.

14. The spa chair of claim 10, further comprising:

the liner; and wherein the gas delivery conduit of the liner defines an opening configured to receive the discharge end of the gas discharge apparatus that is exposed at the inner face of the liner.

15. The spa chair of claim 14, wherein:

the opening of the gas delivery conduit of the liner is arranged to be located at an interior face of the basin substantially defining a volume of the liquid which is containable in the basin, and the discharge end of the gas discharge apparatus is carried on a longitudinally extending tube arranged to extend from a location outside the interior of the basin and into said interior such that the tube is insertable into the gas delivery conduit to extend at least partially along the gas delivery conduit to resist relative movement of the liner transversely to the tube.

16. The spa chair of claim 15, wherein the liner is flexible and the discharge end of the gas discharge apparatus, to be received inside the gas delivery conduit, comprises a rigid body.

17. The spa chair of claim 10, wherein the first portion is arranged to be supported on a rim of the basin outside the interior of the basin where the liquid is containable.

18. The spa chair of claim 10, wherein the first portion is embedded in an inside surface of the basin.

19. The device of claim 1, wherein in the working position, the respective contact surfaces of the first and second portions form a gap for receiving a thickness of the liner between the inner and outer faces of the liner.

20. The spa chair of claim 10, wherein in the working position of the securing device, the respective contact surfaces of the first and second portions form a gap for receiving a thickness of the liner between the inner and outer faces of the liner.

21. The spa chair of claim 10, wherein the common planes of the respective contact surfaces of the first portion and the second portion are substantially parallel to the mounting surface of the basin.

22. The device of claim 1, wherein the contact surfaces of the inner face of the first portion are configured to be substantially parallel to the mounting surface of the basin.

23. The spa chair of claim 10, wherein the contact surfaces of the inner face of the first portion are substantially parallel to the mounting surface of the basin.

* * * * *